United States Patent [19]

Woodbury et al.

[11] Patent Number: 5,191,581
[45] Date of Patent: Mar. 2, 1993

[54] METHOD AND APPARATUS FOR PROVIDING HIGH PERFORMANCE INTERCONNECTION BETWEEN INTERFACE CIRCUITS COUPLED TO INFORMATION BUSES

[75] Inventors: Mark P. Woodbury, Amherst; Richard E. Hudnall, Nashua; Philip G. Hunt, Hampstead, all of N.H.

[73] Assignee: Digital Equipment Corporation, Maynard, Mass.

[21] Appl. No.: 623,504

[22] Filed: Dec. 7, 1990

[51] Int. Cl.$^5$ .................... H04L 12/40; H04J 3/02
[52] U.S. Cl. .................... 370/85.9; 370/85.13; 307/455; 395/275
[58] Field of Search .................. 370/85.1, 85.11, 85.13, 370/85.14, 85.9, 67; 307/455, 456; 395/275

[56] References Cited

U.S. PATENT DOCUMENTS

| | | | |
|---|---|---|---|
| 4,479,228 | 10/1984 | Crane | 375/7 |
| 4,484,028 | 11/1984 | Kelley et al. | 370/29 |
| 4,595,923 | 6/1986 | McFarland, Jr. | 340/825.52 |
| 4,622,551 | 11/1986 | Kupersmith et al. | 340/825.06 |
| 4,683,534 | 7/1987 | Tietjen et al. | 364/200 |
| 4,706,082 | 11/1987 | Miesterfeld et al. | 340/825.5 |
| 4,710,922 | 12/1987 | Scott | 370/112 |
| 4,746,918 | 5/1988 | Dijkers et al. | 370/85.1 |
| 4,750,111 | 6/1988 | Crosby, Jr. et al. | 364/200 |
| 4,825,402 | 4/1989 | Jalali | 364/900 |
| 4,858,234 | 8/1989 | Hartwell et al. | 364/900 |
| 4,864,496 | 9/1989 | Triolo et al. | 364/200 |
| 4,881,165 | 11/1989 | Sager et al. | 364/200 |
| 4,908,530 | 3/1990 | Huang | 307/443 |
| 4,931,672 | 6/1990 | Khan | 307/455 |
| 4,932,040 | 6/1990 | Barlow | 364/200 |
| 4,935,894 | 6/1990 | Terns et al. | 364/900 |
| 5,029,124 | 7/1991 | Leahy et al. | 370/85.1 |
| 5,033,045 | 7/1991 | Ramel et al. | 370/85.13 |

Primary Examiner—Douglas W. Olms
Assistant Examiner—H. Kizou
Attorney, Agent, or Firm—Ronald E. Myrick; Barry N. Young; Ronald C. Hudgens

[57] ABSTRACT

Methods and apparatus are provided for interconnecting first and second information buses each having a plurality of data lines. A pair of unidirectional information paths each consisting of twisted-pair cables are provided, along with a 25 MHz strobe. Information is transmitted using pseudo-ECL signal levels. A pair of clock differential receiver circuits is provided such that data is transferred over the interconnect bus using both the rising and falling edges of the transmitted clock signal and transferred from one bus to another at a rate of 50 MHz.

24 Claims, 9 Drawing Sheets

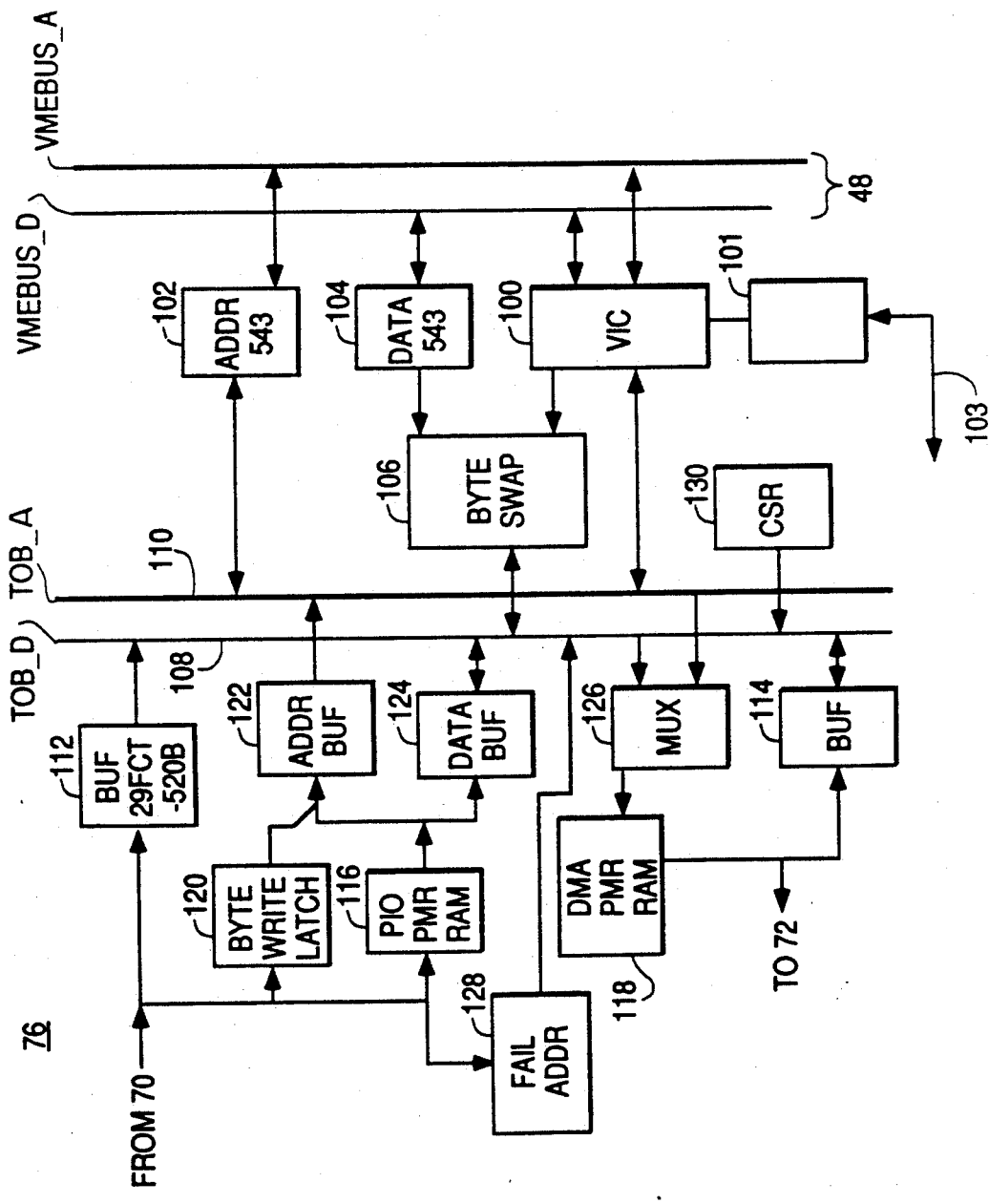

METHOD AND APPARATUS FOR PROVIDING HIGH PERFORMANCE INTERCONNECTION BETWEEN INTERFACE CIRCUITS COUPLED TO INFORMATION BUSES

BACKGROUND OF THE INVENTION

1. Field of the Invention

The invention relates to data processing systems and, more particularly, to data processing systems employing multiple buses.

2. Discussion of the Related Art

In computers and data processing systems, a bus is commonly employed to interconnect the various elements of the system. For example, a central processing unit is typically connected to memory components, input/output (I/O) devices, etc., via a bus capable of carrying the signals associated with the operation of each element. These signals include, for example, data signals, clock signals, and control signals. The bus must be capable of carrying such signals to all components coupled to the bus so that the desired operation can be carried out by the computer system.

As computer systems achieve increasingly higher levels of performance, it is sometimes desirable to provide more than one bus in the computer system. For example, it may be desirable to provide a high speed main system bus which interconnects processors and high speed memory components, and to provide a separate bus which interconnects I/O devices such as disk drives and tape drives to an I/O controller.

Initially, manufacturers of computer systems provided proprietary buses with which to interconnect components of the system. There is now an increasing trend toward the use of standardized buses, in which specifications of the bus are published for use by all manufacturers. Many manufacturers can then supply components specifically for use with the standard bus.

Multiple standard buses are now available, each having a different set of characteristics. However, there is an increasing need to provide the capability to assemble computer systems employing components connected to various types of standard buses. Methods and apparatus for providing such interconnections are known in the art. Known interconnection systems employ serial lines, ribbon cable, and fiber optics. For example, methods and apparatus for interconnecting computer buses using an interconnection known as the IBUS are described in U.S. Pat. No. 4,858,234 issued Aug. 15, 1989 to David W. Hartwell et al., and assigned to the assignee of the present invention.

As a result of such trends, the importance of various features of an interconnection system is becoming apparent. For example, it is desirable for an interconnection system to provide high data transfer rates between buses, such that functionality on high performance buses is not compromised due to waiting time caused by an inefficient bus interconnection system. It is further desirable to provide methods and apparatus for interconnecting information buses of different sizes and to provide interconnection between different cabinets, without requiring a backplane connection between buses. Intercabinet connectivity gives rise to the need for high noise immunity and, correspondingly, low noise emissions. It is further desirable to provide methods and apparatus for interconnecting buses which utilize the minimum number of interconnection lines.

With the increasing number of standardized buses, it is important for a manufacturer to enable interconnectivity of the manufacturer's products with as wide a variety of standard bus systems as possible. Implementation of custom interconnection methods and apparatus for each bus pair gives rise to high design and manufacturing cost. It is therefore desirable to provide apparatus and methods for interconnecting information buses which are extremely flexible, and employ a large number of common components to permit multiple interconnection applications with a minimum of cost.

None of the known methods and apparatus for interconnecting information buses fully meet the requirements noted above.

SUMMARY OF THE INVENTION

It is an object of the present invention to provide methods and apparatus for connecting information buses which more fully meet the requirements noted above than currently known methods and apparatus. Additional objects and advantages of the invention will be set forth in part in the description which follows and, in part, will be obvious from the description or may be learned by practice of the invention. The objects and advantages of the invention will be realized and attained by means of the instrumentalities and combinations particularly pointed out in the appended claims.

To achieve the objects and in accordance with the purpose of the invention, as embodied and broadly described herein, the invention, in one aspect, comprises apparatus for interconnecting first and second interface circuits respectively coupled to first and second information buses each having a plurality of data lines. The apparatus comprises first and second multiconductor unidirectional information paths each having a plurality of data signals, the number of data signals in each information path being less than the number of data lines in at least one of the information buses. The apparatus further comprises a first interconnect module for coupling to the first interface circuit, the first interconnect module comprising a first pair of registers each for respectively and simultaneously receiving a set of a first pair of sets of information from the first interface circuit, a first multiplexer for sequentially transferring each set of the first pair of sets of information from the first pair of registers over the data lines of the first information path, and a first connector coupled to the first multiplexer. The apparatus also comprises a second interconnect module for coupling to the second interface circuit, the second interconnect module comprising a second pair of registers each for respectively supplying a set of the first pair of sets of information to the second interface circuit, a second connector removably connected to the first connector, and a first demultiplexer coupled to the second connector for receiving the first pair of sets of information sequentially transferred by the first multiplexer and for respectively supplying the first pair of sets of information to the second pair of registers. The apparatus additionally comprises a third interconnect module for coupling to the second interface circuit and comprising a third pair of registers each for respectively and simultaneously receiving a set of a second pair of sets of information from the second interface circuit, a second multiplexer coupled to the second connector for sequentially transferring each set of the second pair of sets of information from the third pair of registers over the data lines of the second information path. The apparatus also comprises a fourth interconnect module for coupling to the first interface circuit and comprising a fourth pair of registers each for respectively and simultaneously supplying a set of the second pair of sets of information to the first interface circuit, and a second demultiplexer coupled to the first connector for receiving the second pair of sets of information sequentially transferred by the second multiplexer and for respectively supplying the second pair of sets of information to the fourth pair of registers.

The invention, in another aspect, comprises a method for interconnecting first and second interface circuits respectively coupled to first and second information buses each having a plurality of data lines. The method comprises the steps of respectively and simultaneously receiving a first pair of sets of information from the first interface circuit into a first pair of registers, and operating a first multiplexer to sequentially transfer each set of the first pair of sets of information from the first pair of registers over the data lines of the first information path. The method comprises the additional steps of respectively receiving, in a second pair of registers, the first pair of sets of information sequentially transferred by the first multiplexer; and respectively and simultaneously supplying the first pair of sets of information from the second pair of registers to the second interface circuit. The method comprises the further steps of respectively and simultaneously receiving a second pair of sets of information from the second interface circuit into a third pair of registers; and operating a second multiplexer to sequentially transfer each set of the second pair of sets of information from the third pair of registers over the data lines of the second information path. The method comprises the final steps of respectively receiving, in a fourth pair of registers, the second pair of sets of information sequentially transferred by the second multiplexer; and respectively and simultaneously supplying the second pair of sets of information from the fourth pair of registers to the first interface circuit.

The accompanying drawings which are incorporated in and constitute a part of the specification, illustrate one embodiment of the invention and, together with a description, serve to explain the principals of the invention.

BRIEF DESCRIPTION OF THE DRAWINGS

FIG. 4 is a detailed block diagram of an interface circuit of the second adapter module, shown in FIGS. 1 and 2;

DETAILED DESCRIPTION OF THE PREFERRED EMBODIMENT

Figure 1:
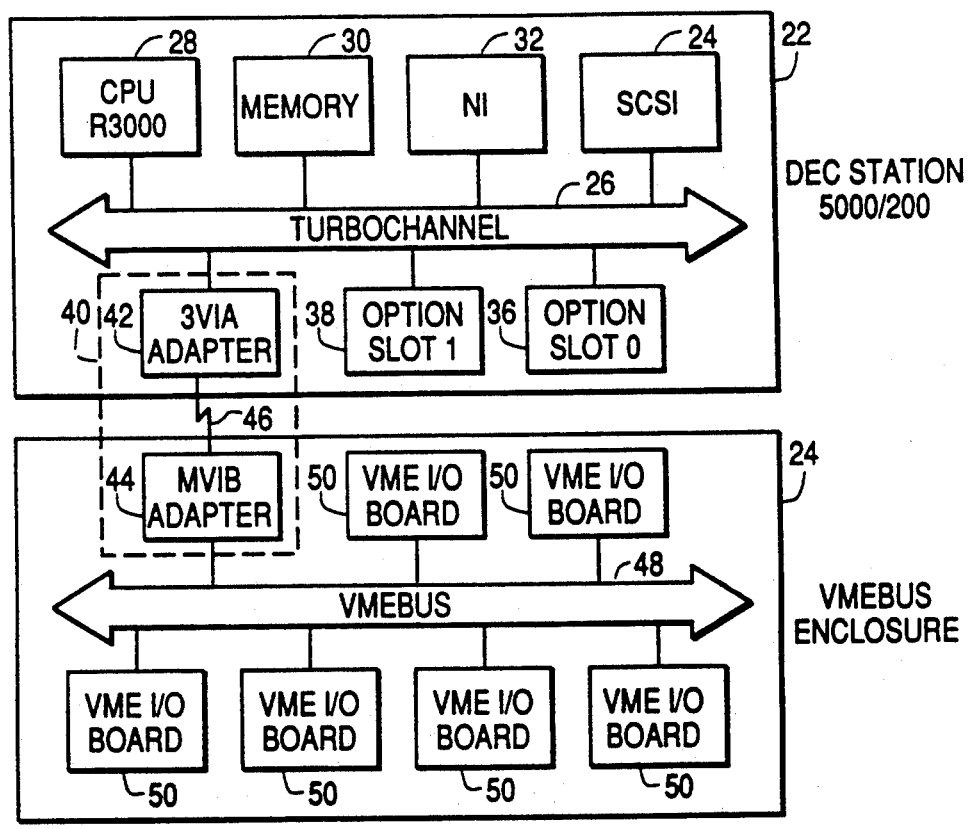
FIG. 1 is a block diagram of a computer system comprising a pair of information buses each having a plurality of components and connected by an interconnection system including a pair of adapters and an interconnection bus, according to a preferred embodiment of the present invention.

Reference will now be made in detail to the presently preferred embodiment of the invention, an example of which is illustrated in the accompanying drawings. Throughout the drawings, like reference characters are used to indicate like elements.

FIG. 1 shows an example of a data processing system 20 which embodies the present invention. System 20 includes first and second subsystems 22 and 24. Subsystem 22, in the preferred embodiment, comprises a DECstation 5000/200 engineering workstation manufactured by the Digital Equipment Corporation. Subsystem 22 includes a plurality of components interconnected by a system bus 26 which, in the preferred embodiment, comprises a standard thirty-two bit public bus known as the TURBOchannel, and which mechanically includes a cabinet having multiple slots interconnected by backplane wiring. The "thirty-two bit" designation refers to thirty-two signal lines of the TURBOchannel which carry address and data information at various times. Such lines will henceforth be referred to as "data lines", as distinguished from control lines which carry other types of information other than address and data information.

The TURBOchannel is an internal system bus used in products manufactured by the Digital Equipment Corporation, the assignee of the present invention. The TURBOchannel constitutes an "open architecture" bus, and detailed specifications of the TURBOchannel are described in the TURBOchannel hardware specification, Order No. EK-369AA-OD-005, publicly available from the Digital Equipment Corporation. Subsystem 22 includes a system module 28 connected to system bus 26. In a preferred embodiment, system module 28 comprises a R3000 processor.

Subsystem 22 also includes a plurality of option modules. Such option modules may include a memory 30, a communications (Ethernet) controller 32 (designated NI in FIG. 1), and a Small Computer System Interface (SCSI) controller 34. Subsystem 22 also includes a pair of slots 36 and 38 which may receive other system components such as additional memory or controllers.

System 20 also includes an interconnection apparatus 40 which in turn comprises first and second adapter modules 42 and 44 interconnected by an interconnection bus 46. Adapter module 42 is removably connected to system bus 26 by occupying a slot in the TURBOchannel cabinet.

In the preferred embodiment, second subsystem 24 comprises a VMEbus system including a second system bus 48. System bus 48, in the preferred embodiment, constitutes a VMEbus, which is an asynchronous interlocked bus with separate data and address lines. The VMEbus is an industry-standard bus defined by IEEE Standard 1014. Subsystem 24 further includes a plurality of VME I/O boards 50, commercially available from a number of sources including Motorola Corporation and performing such functions as array processing, image processing, communications control, and I/O operations. Second adapter module 44 is removably connected to second system bus 48, by occupying a slot on bus 48.

Although the present invention provides the capability for interconnecting a wide variety of buses, subsystem 22 in the preferred embodiment constitutes a host subsystem and subsystem 24 constitutes an I/O subsystem. First system bus 26 will be referred to as "the TURBOchannel" (or "3MAX") and system bus 48 will be referred to as "the VMEbus." Adapter 42 will be referred to as host adapter 42. Host adapter 42 will also occasionally be referred to in tables as "3VIA." Similarly adapter 44 will be referred to as I/O adapter 44 or, in tables, as "MVIB." Interconnection bus 46 will be referred to in tables as "YAbus."

Figure 2:
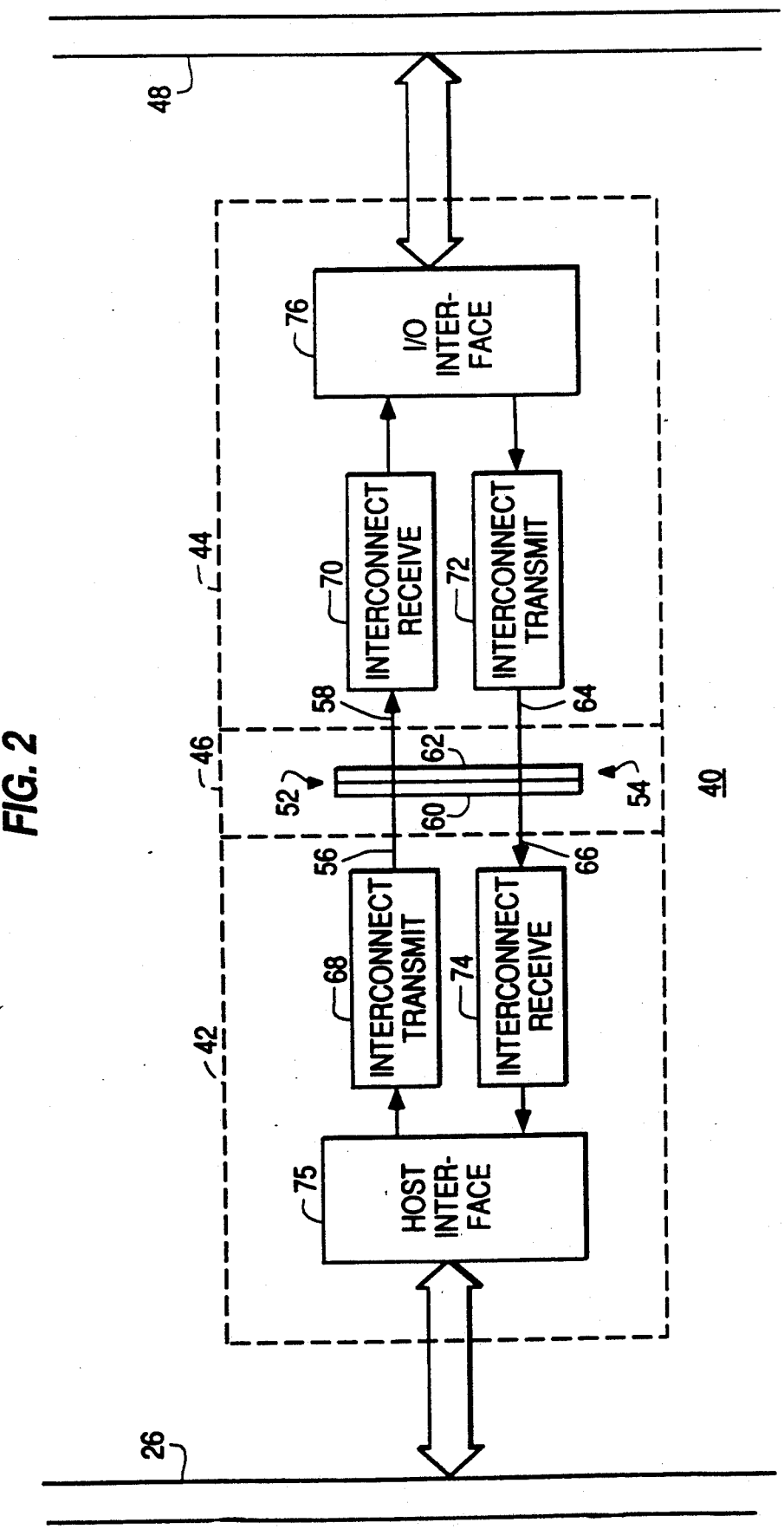
FIG. 2 is a block diagram of the adapter modules and interconnection bus of the system of FIG. 1.

Referring now to FIG. 2, interconnect apparatus 40 is shown in greater detail. Interconnection bus 46 of apparatus 40 includes first and second multiconductor unidirectional information paths 52 and 54 each having a plurality of data signals, the number of data signals in each information path being less than the number of data lines in the TURBOchannel 26 and the VMEbus 48. In the preferred embodiment, information paths 52 and each include sixteen data signals. In particular, information path 52 includes first and second twisted-pair cables 56 and 58 each comprising a plurality of twisted-pair conductors and respectively connected to first and second connectors 60 and 62. Path 54 includes third and fourth twisted-pair cables 64 and 66 respectively connected to connectors 62 and 60. In addition, information paths 52 and 54 each include three parity signals, three type-and-mask signals, a strobe signal, and a reset signal. Information paths 52 and 54 thus include forty-seven pairs of twisted conductors (plus three spares) enclosed in both braid and foil shields. Pin numbers of information paths 52 and 54, in preferred embodiment, are shown in Table 1.

TABLE 1

| Pins | Direction | Function |
|---|---|---|
| 16 | CPU to VME | Data (15.00) |
| 2 | CPU to VME | Byte Parity [1.0] |
| 3 | CPU to VME | Type/byte mask (TAM) |
| 1 | CPU to VME | Type Parity |
| 1 | CPU to VME | Strobe |
| 1 | CPU to VME | Reset |
| 16 | VME to CPU | Data (15.00) |
| 2 | VME to CPU | Byte Parity [1.0] |
| 3 | VME to CPU | Type/byte mask (TAM) |
| 1 | VME to CPU | Type Parity |
| 1 | VME to CPU | Strobe |
| 3 | undefined | soare |

Each signal requires two pins with twisted-pair wiring. Although the present preferred embodiment employs a unitary cable including fifty pairs of twisted conductors surrounded by shields and interconnected by first and second connectors 60 and 62, the invention is not so limited. Other types of connections could, of course, be employed, as is readily understood by those skilled in the art.

Apparatus 40 also includes first, second, third, and fourth interconnect modules 68, 70, 72, and 74. Modules 68 and 72 are identical and each constitute an interconnect transmitter. Modules 70 and 74 are identical and each constitute an interconnect receiver. Thus, only modules 68 and 70 will be described in detail. Host adapter 42 includes a host interface circuit 75 and adapter 44 includes an I/O interface circuit 76.

According to the preferred embodiment, host interface circuit 75 is specifically adapted to interface with a first information bus, such as TURBOchannel 26. I/O interface circuit 76 is specifically adapted to interface with a second information bus, such as VMEbus 48. As will be described below in greater detail, host interface circuit 75 receives and transmits over TURBOchannel 26 using instructions defined as part of the TURBOchannel specification. Similarly, I/O interface circuit 76 transmits and receives over VMEbus 48 using instructions defined as part of the VMEbus specification. It is an important feature of the present invention, however, that information buses other than TURBOchannel 26 and VMEbus 48 can be easily interconnected, with a minimum of redesign, by employing interconnect bus 46 and interconnect modules 68-74 in conjunction with a different host interface circuit 75 and a different I/O interface circuit 76. For example, host interface circuit 75 could be designed to interface with a system employing the DECsystem 5500 RISC-based Server manufactured by Digital Equipment Corporation. Similarly, I/O interface circuit 76 could be redesigned to interface with a system employing another bus, such as Futurebus+.

As be can seen in FIG. 2, data flows bidirectionally between TURBOchannel 6 and host interface circuit 75. Data flows unidirectionally from host interface circuit 75 through first interconnect module 68, first twisted-pair cable 56, first connector 60, second connector 62, second twisted-pair cable 58, and second interconnect module 70 to I/O interface circuit 76. Data flows bidirectionally between I/O interface circuit 76 and VMEbus 48. Data flows unidirectionally from I/O interface circuit 76 through third interconnect module 72, third twisted-pair cable 64, second connector 62, first connector 60, fourth twisted-pair cable 66, and fourth interconnect module 74 to host interface circuit 75.

As described more completely in the aforementioned TURBOchannel specification, TURBOchannel 26 is a synchronous thirty-two bit multiplexed address-data bus with a 40 nS cycle time. It is capable of transfers up to 100 Mbytes/second with direct memory access (DMA). TURBOchannel 26 supports a single interrupt per slot and maps up to 512 Mbytes of I/O with a "SEL" line. Arbitration is provided for DMA, and a "conflict" signal allows CPU read and write requests to be "retried" in the event of contention on VMEbus 48. Byte mask bytes are supported for CPU I/O transactions (in the address field) but not for DMA. Host adapter 42 performs read-modify-write cycles (non-atomic) to facilitate DMA byte writes to memory circuit 30 (FIG. 1). Instruction types supported by TURBOchannel 26 are described in Table 2.

TABLE 2

| TURBOchannel Signals | |
|---|---|
| ad | Address/data bus |
| -sel | I/O read/write select |
| -rdy | I/O read/write ready |
| -aCe | I/O address chip enable |
| -write | I/O read/write specificer |
| -conflict | I/O read/write conflict |
| -rReq | DMA read request |
| -wReq | DMA write request |
| -ack | DMA read/write acknowledge |
| -err | DMA read uncorrectable data error |
| -reset | System reset |
| -int | I/O interrupt |

TABLE 2-continued

TURBOchannel Signals

| | |
|---|---|
| clk | 25 MHz system clock |

Figure 3:
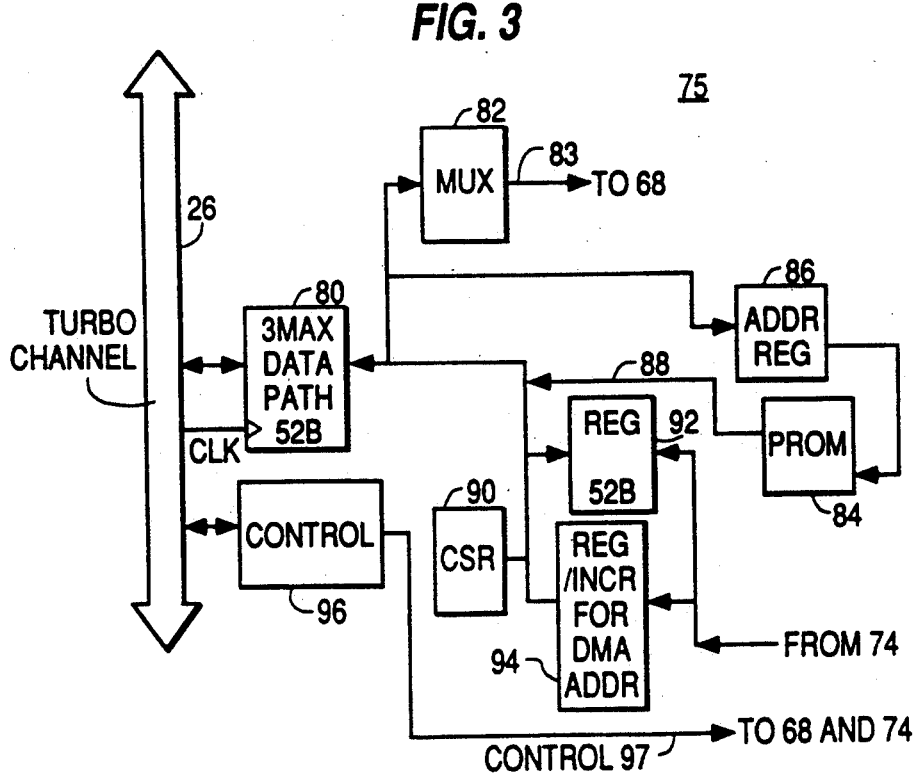
FIG. 3 is a detailed block diagram of an interface circuit of the first adapter module of FIGS. 1 and 2.

Referring now to FIG. 3, there is shown a detailed block diagram of host interface circuit 75. As seen in FIG. 3, data is transferred between TURBOchannel 26 and host interface circuit 75 by means of a buffer 80. Buffer 80 may be, for example, a type 29FCT52B buffer circuit commercially available from Integrated Device Technology, Inc. (IDT). When a write instruction is being implemented from subsystem 22 to subsystem 24, address and data from TURBOchannel 26 (via buffer 80) are strobed out to interconnect module 68. In certain applications, address and data information may be first processed by a multiplexer 82.

Host interface circuit 75 also includes a programmable read-only memory (PROM) 84. PROM 84 is provided for diagnostic purposes. Address information from buffer 80 is translated via an address register 86 as address inputs to PROM 84. The address translation process is performed in order to uniquely select a specific location in PROM 84, typically to execute instructions encoded in PROM 84. The contents of PROM 84 are then supplied over line 88 to buffer 80.

Host interface circuit 75 also includes a command status register (CSR) 90. CSR 90 stores error and status information from interconnect bus 46 and provides reset control. The specific configuration of CSR 90 is described in Table 3.

TABLE 3

3VIA Command/Status Register

| Bit Fields | Description |
|---|---|
| [31:24] | Reserved data is undefined |
| [23] | Enable Local Interrupt<br>Read/Write<br>This bit, when set to a logical "1", will allow local (3VIA or MVIB) interrupts to be generated from the 3VIA.<br>On power up - cleared to a logical "0". |
| [22:21] | Force Error<br>Read/Write<br>These bits can cause the generation of YAbus protocol errors for diagnostic test purposes. The following conditions can be generated:<br>"00" - No action<br>"01" - Sequence Error<br>"10" - Idle Error<br>"11" - Command Error<br>On power up - cleared to a logical "0". |
| [20] | Select 4M/32Mbyte I/O space<br>Read/Write<br>This bit, when set to a logical "1", will cause the 3VIA to map for 32Mbytes of I/O space and not allow PROM to replicate every 4Mbytes. When cleared to a logical "0", the module will map to 4Mbytes for 3MAX mode.<br>On power up - cleared to a logical "0". |
| [19] | PROM Location Select<br>Read/Write<br>This bit, when cleared to a logical "0", will only allow transactions to the 3VIA PROM and local CSR. This will prevent the 3VIA from decoding transactions to locations 3.75–4Mbytes which are alternate PROM locations for early TURBOchannel options. Accesses to these location before the MVIB has been initialized could cause transactions on the VMEbus, providing erroneous data to the 3MAX configuration software. When set to a logical "1", transactions to these locations (3.75–4M) |

TABLE 3-continued

3VIA Command/Status Register

| Bit Fields | Description |
|---|---|
| | will be interpreted as cycles intended for VME and the 3VIA will pass on the cycle to the MVIB.<br>On power up - cleared to a logical "0". |
| [18] | Reset 3VIA<br>Read/Write<br>This bit, when set to a logical "1", will cause the 3VIA's control registers and state machines to be latched in a reset state. Setting the bit to a logical "0" will take the 3VIA out of reset and allow normal operation.<br>On power up - cleared to a logical "0". |
| [17] | Reset MVIB<br>Read/Write<br>This bit, when cleared to a logical "0", will cause the 3VIA to assert and latch a Reset on the YAbus (hardware line) to the MVIB. Setting the bit to a logical "1" will take the MVIB out of reset and allow normal operation.<br>On power up - cleared to a logical "0". |
| [16] | Unused<br>Read/Write<br>data is undefined, and cleared to "0" on power-up |
| [15] | YAbus Fail_Request Received<br>Read only<br>This status bit, when set to a logical "1", indicates that a YAbus Fail_Request message has been received. This bit is cleared by writing location Clear_Error Section 7.7.2.<br>On power up - cleared to a logical "0". |
| [14] | YAbus Fail_Request Sent<br>Read Only<br>This status bit, when set to a logical "1", indicates that a YAbus Fail_Request message has been sent. This bit is cleared by writing location Clear_Error Section 7.7.2.<br>On power up - cleared to a logical "0". |
| [13] | YAbus Nack received<br>Read only<br>This status bit, when set to a logical "1", indicates that a YAbus Nack message has been received when Flag A was set (implying that there is an outstanding message). This bit is cleared by writing location Clear_Error Section 7.7.2.<br>On power up - cleared to a logical "0". |
| [12] | No YAbus receive clock<br>Read only<br>This status bit, when set to a logical "1", indicates that no YAbus receive clock has been detected. This bit is cleared by writing location Clear_Error Section 7.7.2.<br>On power up - cleared to a logical "0". |
| [11] | YAbus transaction error<br>Read only<br>This status bit, when set to a logical "1", indicates that a YAbus transaction error has been detected. This bit is cleared by writing location Clear_Error Section 7.7.2.<br>On power up - cleared to a logical "0". |
| [10] | YAbus TAM error<br>Read only<br>This status bit, when set to a logical "1", indicates that a YAbus TAM error has been received. This bit is cleared by writing location Clear_Error Section 7.7.2.<br>On power up - cleared to a logical "0". |
| [9] | YAbus data parity error<br>Read only<br>This status bit, when set to a logical "1", indicates that a YAbus data parity error has been detected. This bit is cleared by writing location Clear_Error Section 7.7.2.<br>On power up - cleared to a logical "0". |
| [8] | YAbus idle error<br>Read only |

TABLE 3-continued

| Blt Fields | 3VIA Command/Status Register Description |
|---|---|
|  | This status bit, when set to a logical "1", indicates that a YAbus idle command error has been detected. This bit is cleared by writing location Clear_Error Section 7.7.2. On power up - cleared to a logical "0". |
| [7:0] | 3VIA Interrupt Vector Read/Write Thises bits are returned to the TURBOchannel on a IVS read cycle when: there is a pending 3VIA_sourced interrupt request pending and the Local Interrupt has been enabled. This vector should be loaded with the value 01H to specify that interrupt vector 01 was generated. On power up - undefined. |

Host interface circuit 75 also includes a register 92. Register 92 is provided for synchronizing data between a FIFO 190 (FIG. 6) and output buffer 80 onto the TURBOchannel. Register 92 may also be a type 29FCT52B buffer circuit available from IDT.

Host interface circuit 75 further includes a register 94 which is provided to enable DMA transfers for the VMEbus 48. Specifically, address information is stored in register 94 and incremented as each word is transferred to TURBOchannel 26 from VMEbus 48 via a DMA process.

Host interface circuit 75 further includes a control logic circuit 96. Circuit 96 provides translation between instructions defined for TURBOchannel 26 and instructions defined for interconnect bus 46 over lines 97, as will be described in greater detail below.

Referring now to FIG. 4, there is shown a detailed block diagram of I/O interface circuit 76. I/O interface circuit 76 uses a type VIC068 VMEbus controller 100 commercially available from the VTC Corporation to create all VMEbus control signals. VIC controller 100 fully conforms to IEEE Standard 1014, and supports all standard VMEbus operations, including data transfer instructions, as shown in Table 4.

TABLE 4

| Mnemonic | Type of Cycles |
|---|---|
| ADO | Address-Only |
| D08(EO) | Single-even-byte transfer |
|  | BYTE(0) READ |
|  | BYTE(2) READ |
|  | BYTE(0) WRITE |
|  | BYTE(2) WRITE |
| D08(EO) or D08(O) | Single-odd-byte transfers |
|  | BYTE(1) READ |
|  | BYTE(3) READ |
|  | BYTE(1) WRITE |
|  | BYTE(3) WRITE |
| D16 | Double-byte transfers |
|  | BYTE(0-1) READ |
|  | BYTE(2-3) READ |
|  | BYTE(0-1) WRITE |
|  | BYTE(2-3) WRITE |
| D32 | Quad-byte transfers |
|  | BYTE(0-3) READ |
|  | BYTE(0-3) WRITE |
| D08(EO): BLT | Single-byte block transfers |
|  | SINGLE-BYTE BLOCK READ |
|  | SINGLE-BYTE BLOCK WRITE |
| D16: BLT | Double-byte block transfers |
|  | DOUBLE-BYTE BLOCK READ |
|  | DOUBLE-BYTE BLOCK WRITE |
| D32: BLT | Quad-byte block transfers |
|  | QUAD-BYTE BLOCK READ |
|  | QUAD-BYTE BLOCK WRITE |
| D08(EO): RMW | Single-byte RMW transfers |
|  | BYTE(0) READ-MODIFY-WRITE |
|  | BYTE(1) READ-MODIFY-WRITE |
|  | BYTE(2) READ-MODIFY-WRITE |
|  | BYTE(3) READ-MODIFY-WRITE |
| D16: RMW | Double-byte RMW transfers |
|  | BYTE(0-1) READ-MODIFY-WRITE |
|  | BYTE(2-3) READ-MODIFY-WRITE |
| D32: RMW | Quad-Byte RMW transfers |
|  | BYTE(0-3) READ-MODIFY-WRITE |
| D32:UAT | Unaligned transfers |
|  | BYTE(0-2) READ |
|  | BYTE(1-3) READ |
|  | BYTE(1-2) READ |
|  | BYTE(0-2) WRITE |
|  | BYTE(1-3) WRITE |
|  | BYTE(1-2) WRITE |

In addition, controller 100 handles data bytes 0-7 and address bytes 0-7 from VMEbus 48. High order address and data bytes are transferred to and from VMEbus 48 by buffers 102 and 104, respectively.

Certain VMEbus interrupt features are also supported by VIC controller 100. In particular, VIC controller 100 receives the following interrupts: ACfail (provided by the power supply), DCfail (taken from VMEbus 48), arbitration time out and interrupt handshake from the VME interrupter, requests from the VMEbus interrupts, and the seven local interrupts, as illustrated in Table 5, below. The interrupt handler of VIC controller 100 can encode each interrupt or interrupt group to any of seven levels, as programmed by the Interrupt Handler Register (IHR) of controller 100. A total of twenty interrupt levels are funneled into a single interrupt request to processor 28 (specific to the option slot occupied by processor 28, FIG. 1). The interrupt priority order as processed by VIC controller 100 is set forth in Table 6.

TABLE 5

| | Local Interrupts | | Recommended |
|---|---|---|---|
| Rank | Interrupts | Function | Vector |
| 20 | xVIA | xVIA error | 01H |
| 19 | LIRQ7 | YAbus Xaction fault error | 0FH |
| 17 | LIRQ6 | YAbus Parity error | 0EH |
| 16 | LIRQ5 | PIO Page fault error | 0DH |
| 15 | LIRQ4 | DMA Page fault error | 0CH |
| 14 | LIRQ3 | RMW fault error | 0BH |
| 13 | LIRQ2 | Posted Write operation failure | 0AH |

For LIRQ Vectors specified, load the VIC Local Interrupt Vector Base Register with the value 0BH When these local interrupts are enabled (via the VIC interrupt control registers) they will generate a vector (programmable from the VIC's local interrupt vector base register—see FIG. 12.10 in the VIC068 spec) upon reading the IVS when an interrupt is pending.

All interrupts are sent up the YAbus as 8-bit data, and the 3VIA will present them to the 3MAX as such. The MIPSfair-2 requires a 16-bit vector, so, on the MVIA, the 8-bit vector on d[7:0] is appended to the vector offset register (VOR) on d[15:8] to fill out d[15:0] with the completed 16-bit vector on RIO data [15:0].

TABLE 6

| | Interrupt Priority Order |
|---|---|
| Rank | Interrupt |
| 20 | xVIA |
| 19 | LIRQ7 |
| 18 | Error Group Interrupt |
| 17 | LIRQ6 |
| 16 | LIRQ5 |
| 15 | LIRQ4 |
| 14 | LIRQ3 |
| 13 | LIRQ2 |
| 12 | LIRQ1 |
| 11 | ICGS Group Interrupt |

VIC controller 100 can return an associated vector on data byte 7 of the VME bus 48. This vector may then be used to support a vector cycle on processor 28 or can be read as a vector register. I/O interface circuit 76 will cause VIC controller 100 to perform a vector cycle to obtain this interrupt vector whenever the Interrupt Vector Source (IVS) of VIC controller 100 is read.

VMEbus interrupt vectors 00H through 3FH are reserved for specific peripheral devices not part of the present invention and are used to provide exception vectors generated by I/O interface circuit 76, including all interrupts generated by VIC controller 100, listed in Table 6, and local interrupts of I/O interface circuit 76, listed in Table 5. Additionally, host interface circuit 75 can post an error interrupt at vector 01H to handle protocol errors of interconnect bus 46.

When local interrupts of Table 5 are enabled, a vector is generated upon reading the IVS when an interrupt is pending. All interrupts are sent to interconnect bus 46 as eight-bit data, and host interface circuit 75 will present them to TURBOchannel 26 as such.

I/O interface circuit 76 also includes a control circuit 101, which provides control signals for component circuits of circuit 75. Control circuit 101 is coupled to interconnect modules 70 and 72 via signal lines 103. A detailed description of circuit 101 will be provided below.

As noted above, the embodiment described herein provides interconnection between TURBOchannel 26 and VMEbus 48. TURBOchannel 26 is designed for use with processors manufactured by the Digital Equipment Corporation, and VMEbus 48 is designed for use with processors manufactured by Motorola. Such processors handle data according to different byte order addressing conventions, respectively known to those skilled in the art as "big-endian" and "little-endian." Accordingly, I/O interface circuit 76 includes a byte-swap circuit 106 to provide proper alignment of data and addresses, using a plurality of modes defined in Table 7.

TABLE 7

| Byte Swap Modes | |
|---|---|
| Function | Mode |
| Long Word Swap (swap bytes within words and words within longwords) | 00 |
| Swap Bytes within Words | 01 |
| Swap Words within Longwords | 10 |
| No Swap | 11 |

As shown FIG. 4, 1/0 interface circuit 76 includes an internal data bus 108 and an internal address bus 110. Circuits 100, 102, and 106 ar connected to buses 108 and 110, as shown in FIG. 4.

Incoming data from interconnect bus 46 and module 70 is supplied through a data buffer 112 to internal data bus 108. Buffer 112 may be a type 29FCT520B commercially available from IDT. Outgoing data to interconnect bus 46 is passed from VMEbus 48 through circuits 100, 104, and 106 to data bus 108, and thence through a data buffer 114 to interconnect bus 46, via module 72. Buffer 114 may be a type 29FCT820 circuit commercially available from the Motorola Corporation.

To enable the byte swapping functions mentioned above, I/O interface circuit 76 includes a PIO page map RAM (PMR) 116 and a DMA PMR 118. PIO PMR 116, in connection with a byte write latch 120, an address buffer 122, and a data buffer 124, operates with byte swap circuit 106 to perform byte swapping operations for data transferred from interconnect bus 46 to VME bus 48. DMA PMR 118, in connection with a multiplexer 126 and buffer 114 operates with byte swap circuit 106 to provide byte swapping operations for data transferred from VME bus 48 to interconnection bus 46 via module 72. Design considerations associated with such byte swapping operations are well-known to those skilled in the art, and are not critical to an understanding of the present invention. However, details of byte swapping techniques as implemented in the preferred embodiment are set forth in U.S. patent application Ser. No. 546,507 filed Jun. 29, 1990 by James Duval et al., and assigned to the assignee of the present invention. The disclosure of this application is hereby expressly incorporated by reference.

A failure address register 128 operates in conjunction with PIO PMR 116 to supply a failure address to internal date bus 108 under conditions where the transaction was for some reason unable to complete, such as, for example, a situation where no memory device is present at the addressed location.

A command status register (CSR) 130 is provided in I/O interface circuit 76. The format of CSR 130 is shown and described in Table 8.

TABLE 8

Command/Status Register:

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | | | | | | | | | |

⟶ Reserved

| 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|
| | | | | | | | | | | | | | | | |
| | | | | | | | | | | | | | | | ⟶ MVIB Reset |

TABLE 8-continued

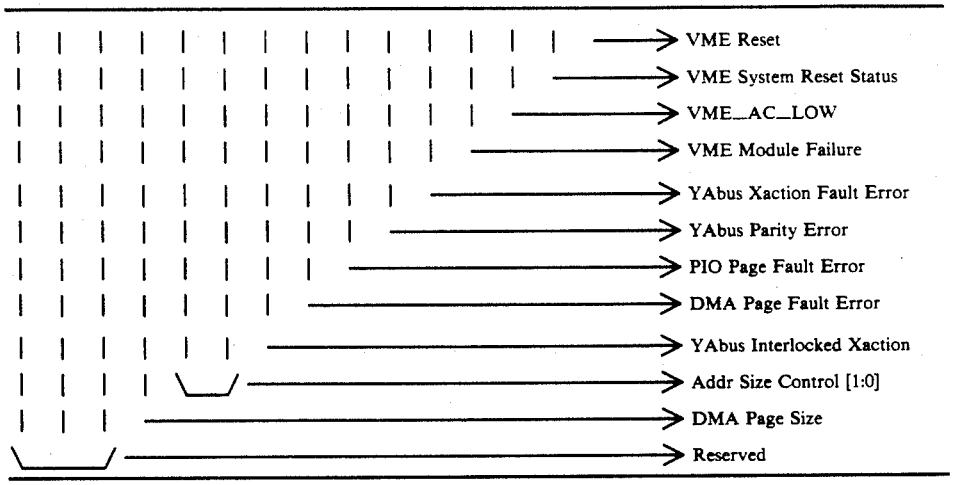

| Bit Fields | Description |
|---|---|
| [31:13] | Reserved<br>data is undefined |
| [12] | Name: DMA Page Size<br>Type: Read/Write<br>This bit when set to a logical one configures the DMA Page map registers to be specified as mapping 512 bytes as used by VMS based systems. When set to a logical zero, this bit configures the DMA PMRs to map 4Kbyte page size as used in Ultrix based systems.<br>Initial State = logical zero after power. |
| [11:10] | Name: Address Size Control [1:0]<br>Type: Read/Write zero to clear<br>These bits enable the lower ¼ (ASC[0]) and the second ¼ (ASC[1]) of the VMEbus memory for interpreting VMEbus transactions and passing them up the YAbus to system memory. A logical "11" will enable the memory space (for all 3 address spaces) and a logical "00" will cause VMEbus transactions to the specified memory space to be ignored.<br>Initial State = logical zero after power. |
| [9] | Name: YAbus Interlocked Xaction<br>Type: Read/Write<br>This bit when set to a logical one indicates that the immediately following TURBOchannel transactions will perform "interlocked" read-modify-write transactions on the VMEbus. The MVIB will generate a YAbus "Interlocked Read" cycle upon the TURBOchannel read request. This should be followed by a TURBOchannel write cycle which will cause the MVIB to generate an "Unlock Write" cycle on the VMEbus. After this transaction pair (interlock read/unlock write) is completed, the software must come and clear this bit to a logical zero. If this sequence is not followed, the transaction will complete (with non-atomic data), and an interrupt will be generated from the MVIB identifying a failed interlock transaction.<br>Alternatively, the MVIB will always interpret an interlock read command from the YAbus, and perform the same transaction pair (without having set this bit). Therefore, systems which support RMW cycles on their host bus do not have to emulate the RMW function in software, they can just use the normal RMW cycle.<br>Initial State = logical zero after power up. |
| [8] | Name: DMA Page Map Fault Error<br>Type: Read/Write zero to clear<br>This bit when set to a logical one indicates that a Page Map Fault error was detected. When set, the transfer is halted, the VME failed address is placed in the VFADR Register, an interrupt is requested if interrupts are enabled, and ALL outstanding DMA requests are purged from the FIFO.<br>This bit can be written to a logical "1" to generate a VMEbus SYSFAIL in the event that a posted DMA write FAIL occurred.<br>Initial State = logical zero after power. |
| [7] | Name: PIO Page Map Fault Error<br>Type: Read/Write zero to clear<br>This when set to a logical one indicates that a nonvalid PIO page fault was detected. When set, the transfer is halted, an interrupt is requested if interrupts are enabled and ALL other PIO requests are purged from the PIO FIFO. The failed PIO address is saved in the CFADR register.<br>Initial State = logical zero after power up. |
| [6] | Name: YAbus Parity Error<br>Type: Read/Write zero to clear<br>This bit when set to a logical one indicates that a YAbus parity error was detected.<br>Initial State = logical zero after power up. |
| [5] | Name: YAbus Xaction Fault Error<br>Type: Read/Write zero to clear<br>This bit when set to a logical one indicates that the MVME detected a CPU or DMA YAbus transaction error.<br>Initial State = logical zero after power up. |
| [4] | Name: VME Module Failure<br>Type: Read/Write "0" to clear<br>This bit when set to a logical "1" indicates that the VME SYSFAIL signal has been asserted by one or more VME modules indicating that a failure has occurred.<br>Initial State = logical zero after power up. |

TABLE 8-continued

[3] Name: VME_AC_Low
Type: Read/Write "0" to clear
This bit when set to a logical "1" indicates that the VME power is going out of spec. There should not be any CPU read/write requests to the MVIB or VME if this bit is set. The MVIB and VME controls go into a power down state during VME_AC_*LOW* *condition.*
Initial State = logical zero after power up or xVIA reset if VME power is OK.
Type: Read Only

[2] Name: VME System Reset Status
Type: Read Only
This bit, when read, provides current (unlatched) status of the VMEbus System Reset line. If a logical "0", it indicates that one or more VME modules is asserting the VME SYSRESET signal on the bus.
If the programmer wishes to reset the VMEbus devices, but not the VIC chip (or MVIB), the VIC's System Reset Register should be used.
Initial State = logical one after power up.

[1] Name: VME RESET
Type: Read/Write
This bit when set to a logical "0" will clear all logic on the VMEbus by asserting VME SYSRESET* and HALT* for a minimum of 200 ms, will reset the VIC chip, including ALL errors, and will drive the VIC chip to an initialized state. Physically, it asserts IRESET on the VIC chip. The bit is latched and must be cleared by writing a logical "1". The bit, when read, will provide the current state of the latched control bit.
Initial State = logical one after power up.

[0] Name: MVIB RESET
Type: Read/Write
This bit when set to a logical "0" will pulse a 'clear' to all logic on the MVIB, including ALL errors, and CSR bits (including this one), the VIC chip [via ]RESET and the VMEbus (via SYSRESET) to an initialized state. It will always return a "1", when read.
Initial State = single pulse ("0") after power up.

Figure 5:
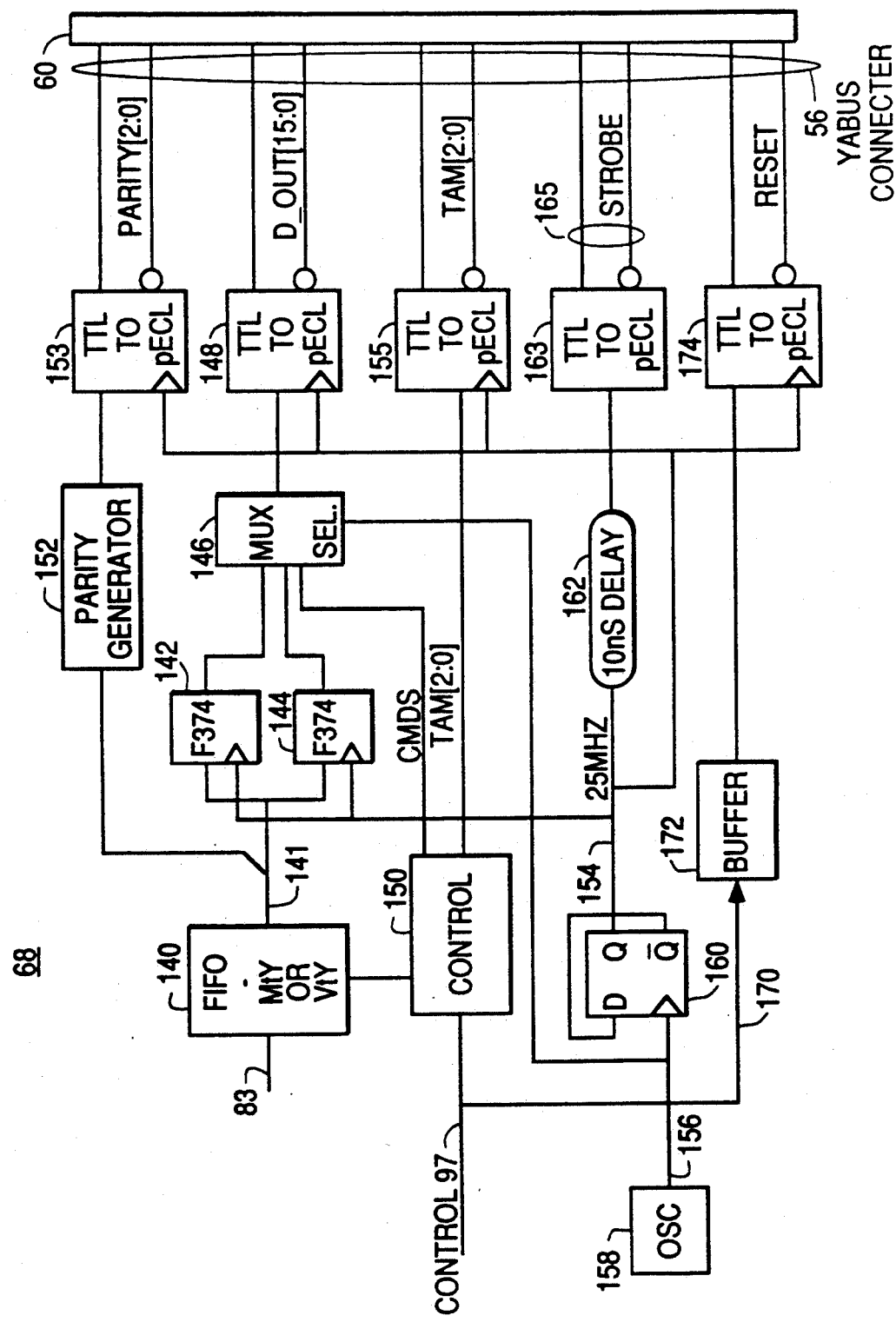
FIG. 5 is a block diagram of an interconnect transmitter included in the adapter modules of FIGS. 3 and 4.

Referring now to FIG. 5, there is shown a detailed block diagram of first interconnect module 68. Module 68 constitutes a transmitter to transmit data from host interface circuit 75 to first twisted-pair cable 56.

Module 68 includes a first in-first out (FIFO) memory 140. Memory 140 stores thirty-two bit words of address and data information from thirty-two corresponding data lines of TURBOchannel 26, via lines 83. The output of memory 140 is supplied to a first pair of registers 142, 144 which each respectively receive one sixteen bit set of a first pair of sets of information transmitted (via FIFO 140) from a first pair of sixteen-line sets of data lines on TURBOchannel 26. Registers 142, 144 may be a type 74F374 circuit commercially available from the Motorola Corporation. The output of registers 142, 144 is each set of the first pair of sets of information from registers 142, 144 over the sixteen data signals of path 52.

As is well known to those skilled in the art, various types of digital logic circuits are available to a circuit designer. One example of such circuit types is emitter-coupled logic (ECL). Another available type is transistor-transistor logic (TTL). Preferably, the invention comprises first ECL differential converter means coupled between the first multiplexer and the first twisted-pair cable for converting TTL-compatible signals into ECL-compatible differential signals. In the preferred embodiment, such means comprises ECL differential converter 148. The functions of converter 148 may be performed by a type 10H351 converter circuit and a type 10H151 differential latch circuit, both commercially available from the Motorola Corporation.

The invention further preferably includes second ECL differential converter means coupled between the second multiplexer and third twisted-pair cable 64 for converting TTL-compatible signals into ECL-compatible differential signals. In the preferred embodiment, such means comprise a differential converter circuit in interconnect module 74 corresponding to converter circuit 148. The functions of this corresponding circuit may also be provided by a type 10H351 converter circuit and a type 10H151 differential latch circuit.

Although true ECL techniques employ voltage levels of −5.2 volts and ground, the preferred embodiment of the present invention provides "pseudo-ECL" (pECL) operation by tying common terminals of circuitry employed herein to the +5.0 volt output of the system power supply. Such ECL-compatible voltage levels on a differential pair of conductors provide important advantages, in that such configuration provides constant current to produce fewer surges and switching noise as compared to TTL and CMOS configurations. Moreover, common mode noise signal levels are reduced, and a single 5-volt power supply may be employed.

Each data signal representing a bit of the first pair of sets of information from registers 142 and 144 is converted into a differential signal transmitted over one twisted pair of conductors of first twisted-pair cable 56.

Control signals from circuit 96 of host interface circuit 75 are supplied over lines 97 to a control logic circuit 150 which converts commands of TURBOchannel 26 into commands unique to interconnection bus 46. A more detailed discussion of circuits 96 and 150 is set forth below with respect to FIGS. 9 and 10, respectively. Interconnection bus commands are shown in Table 9.

TABLE 9

| Command | Hex Code | Sequence string |
|---|---|---|
| Read_word | 43 | Cmd, Addr, Data[5], Idle |
| Read_word_ack | 02 | Cmd, Data, Idle |
| Write_word | 4B | Cmd, Addr, Data, Idle |
| Write_word_ack | 08 | Cmd, Idle |
| Read_block[4] | 51 | Cmd, Addr, Idle |
| Read_block_ack | 16 | Cmd, D_0, D_1, D_n[3], Idle |
| Write_block[4] | 5D | Cmd, Addr, D_0, D_1, D_n[3], Idle |
| Write_block_ack | 18 | Cmd, Idle |
| Interlock_read | 73 | Cmd, Addr, Data, Idle |
| Interlock_read_ack | 32 | Cmd, Data, Idle |
| Unlock_Write | 6B | Cmd, Addr, Data, Idle |
| Unlock_write_ack | 28 | Cmd, Idle |

TABLE 9-continued

Command type and Sequence invoked

| Command | Hex Code | Sequence string |
|---|---|---|
| Interrupt_req | 62 | Cmd, Data[6], Idle |
| Interrupt_req_ack[1] | 20 | Cmd, Idle |
| Purge_complete[2,4] | 30 | Cmd, Idle |
| Nack[7] | 38 | Cmd, Idle |
| Fail_req[8] | 50 | Cmd, Idle |
| Fail_ack | 10 | Cmd, Idle |

[1]An interrupt vector is obtained by performing a register read to a Vector location rather than defining a Vector cycle into the YAbus protocol. The specific host interface module can create any appropriate vector cycle via this "register read" method. In the MIPSfair-2 the MVIA creates this vector cycle.
[2]When a DMA read is requested, the xVIA will send a block of 256 bytes (or to the end of a 256 byte page) to the MVIB's YtM FIFO is the VME DMA did not need all the data sent, the unused data must be purged from the FIFO before more YAbus messages can by sent.
[3]n cannot exceed 63 corresponding to 256 bytes of data.
[4]Issued by the MVIB ONLY.
[5]Data field is provided to send up Byte Mask information for the read transaction.
[6]Data field is provided to send up the IPL (3:1) information of any new posted interrupt request.
[7]Negative acknowledge to transmitting module; parity error, invalid command, non-existent memory, or Invalid PMR selected.
[8]Fail command is issued when multiple messages are outstanding to insure that the proper message gets Nack'd. See Section 10.8 for details.

Interconnection bus commands are supplied from control circuit 150 to multiplexer 146 for transmission over interconnection bus 46. Control circuit 150 also supplies type-and-mask signals for transmission, via an ECL differential converter 155, over interconnection bus 46. The type-and-mask signals designate the type of information carried over data lines supplied as output from converter 148. Specifically, the following types of information are carried across interconnection bus 46: Command, Address, Data, and Idle. Type-and-mask signals define the type of data being transferred, as indicated in Table 10, below. For all types of information, the lower half-word (D[15:0]) is sent first and is clocked on the rising edge of the strobe signal. The upper half-word (D[31:16]) is sent second and is clocked on the falling edge of the strobe signal.

TABLE 10

YAbus Information Type

| Mask (TAM[2]) | Type (TAM[1:0]) | Function |
|---|---|---|
| 0 | 0 0 | Idle |
| 0 | 0 1 | Command |
| 0 | 1 0 | Address |
| 0 | 1 1 | Invalid |
| 1 | mask[1:0][1] | Data |

[1]For Mask bits: "1" indicates that the data byte is valid while "0" indicates invalid data byte. Mask[1] is associated with data_byte[31:24] or data_byte[15:8] while Mask[0] is associated with data_byte[7:0].

Information is transmitted over interconnection bus 46 as a message which begins and ends with an Idle frame and includes a Command frame and an Address frame. A message may also include one or more Data frames. All messages require a positive acknowledge from the receiving end.

The command, address, and data formats of interconnection bus 46 are respectively shown in Tables 11-13.

TABLE 11

Command format
Command Entry Format: Bits [31:00]

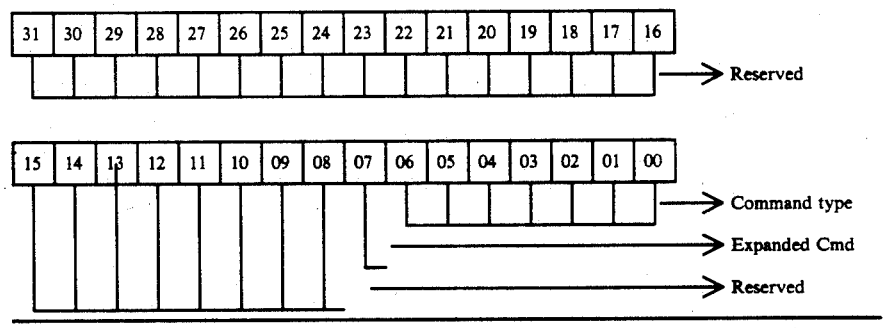

TABLE 12

Address format
Address Entry Format: Bits [31:00]

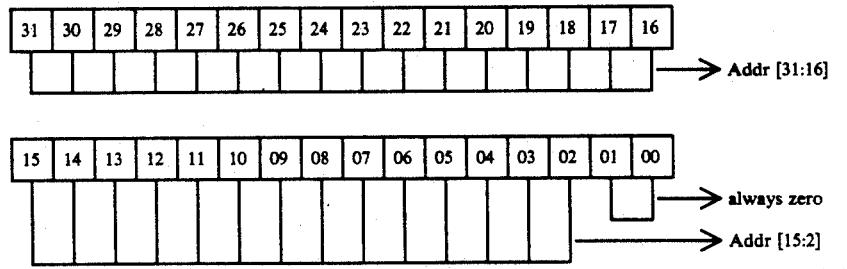

TABLE 13

Data format
Data Entry Format: Bits [31:00]

TABLE 13-continued

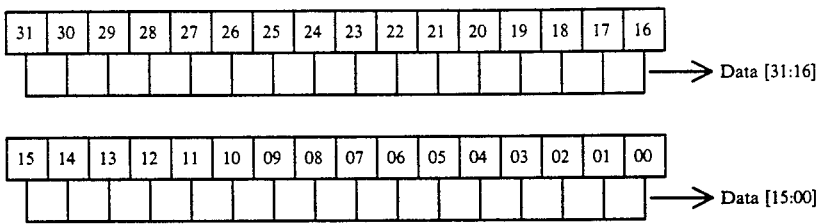

The output of memory 140 is also supplied to a parity generator 152 to generate a pair of parity signals for transmission, via ECL differential converter 153, over interconnection bus 46.

As shown in FIG. 5, a first clock signal 154 is supplied to registers 142, 144. Clock signal 154 has a clock rate, in the preferred embodiment, of 25 MHz. As described in more detail below, a second clock signal, identical to clock signal 154, is supplied to a third pair of registers in module 72.

A third clock signal 156 is also provided. Clock signal 156 is generated by an oscillator circuit 158 at a rate, in the preferred embodiment, of 50 MHz. Third clock signal 156 is supplied to the SEL terminal of multiplexer 146. A corresponding fourth clock signal, identical to third clock signal 156, is supplied to a corresponding multiplexer in module 72. Clock signal 156 is supplied to a 2:1 divider circuit 160 to produce clock signal 154. Clock signal 154 is provided to a delay circuit 162 and a TTL-to-pECL converter circuit 163 to provide a differential strobe signal 165 identical to clock signal 154 but delayed by a period of 10 nS. Circuits 160, 162, and 163 (and corresponding circuits of interconnect module 72) thus constitute divider means for respectively dividing the third and fourth clock signals down to the first and second clock rates to produce the first and second clock signals and for respectively supplying the first and second clock signals over the first and second information paths.

It can be seen that interconnect modules 68 and 72 further include means for respectively supplying first and second clock signals respectively having first and second clock rates of 25 MHz to the first and third pairs of registers to store information in the first and third pairs of registers; means for respectively supplying third and fourth clock signals, respectively having third and fourth clock rates twice the first and second clock rates (i.e., 50 MHz), to the first and second multiplexers; and means responsive to the third and fourth clock signals for respectively transferring information over the first and second information paths at the third and fourth clock rates. In the preferred embodiment, such means comprise oscillator 158, divider 160, and multiplexer 146, and corresponding circuits of interconnect module 72.

Signals on control lines 97 also include a reset signal 170. Reset signal 170 is supplied through a buffer 172 to a converter circuit 174 to provide a pECL differential reset signal over information path 52.

Figure 6:
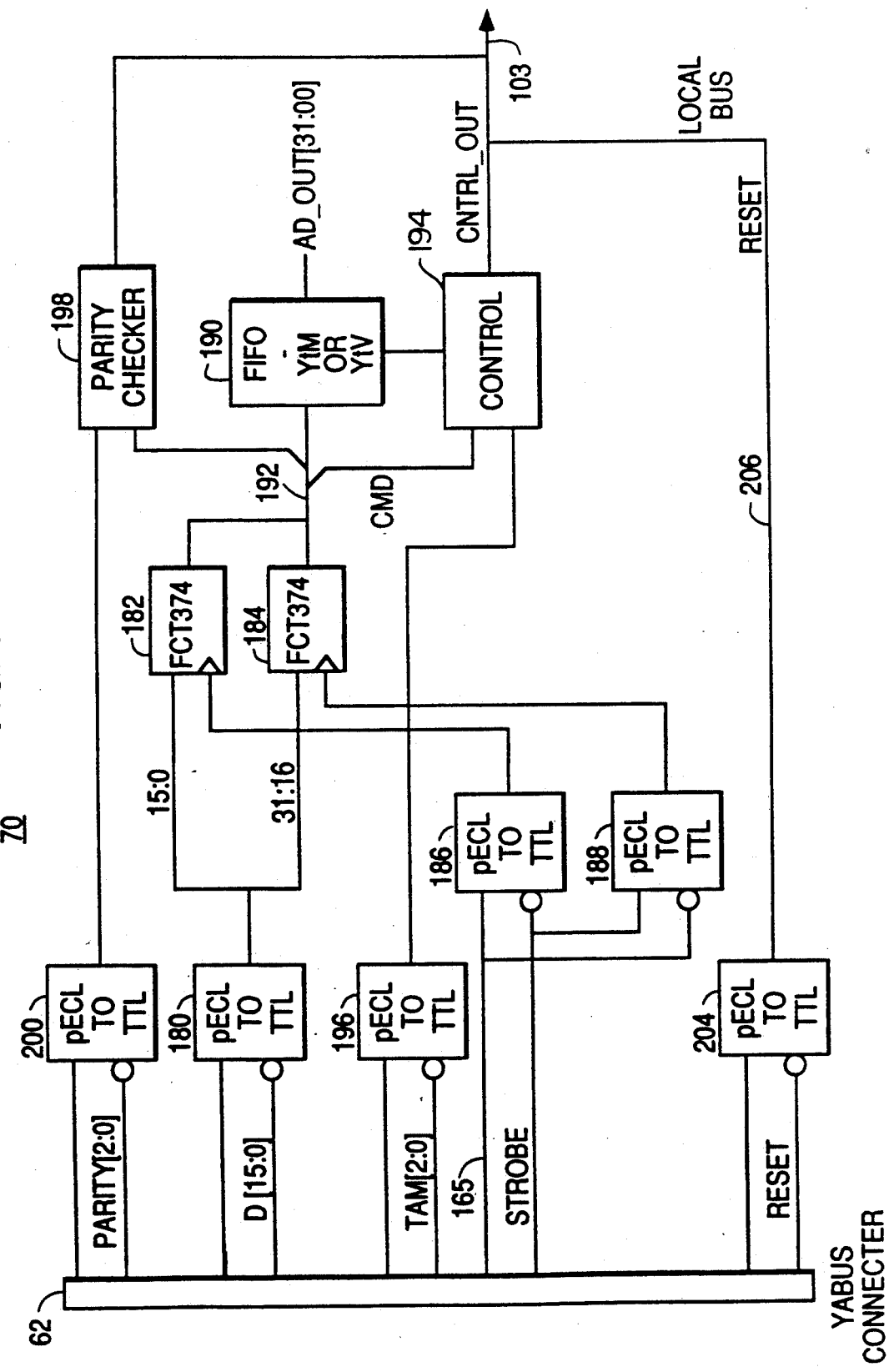
FIG. 6 is a block diagram of an interconnect receiver included in the adapter modules of FIGS. 3 and 4.

Referring now to FIG. 6, there is shown a detailed block diagram of interconnect module 70, constituting a receiver for interconnection bus 46 As noted previously, interconnect module 74 is identical to module 70. Module 74 will therefore not be discussed in detail.

As seen in FIG. 6, differential signals of information path 58 are received via connector 62 and supplied to an ECL differential receiver 180. Each set of the first pair of sets of information are sequentially received via receiver 180 and respectively supplied to a second pair of registers 182, 184. That is, data bits from lines 0-15 of TURBOchannel 26 are first transmitted as the sixteen data signals of interconnect bus 46 and are stored in register 182. Then, data bits from lines 16-31 of TURBOchannel 26 are transmitted as data signals of interconnection bus 46 and stored in register 184.

Strobe signal 165 is received in interconnect modules 70 and 74 by first and second clock multiplexer means for respectively converting the transmitted first and second clock signals to transfer clock signals supplied to the second and fourth pairs of registers to respectively transfer information from the second and fourth pairs of registers to the second and first information buses at the third and fourth clock rates. Preferably, such means comprise a pair of ECL differential receiver circuits 186 and 188 coupled to connector 62 and respectively coupled to registers 182 and 184 to supply the divided third clock signal respectively to registers 182 and 184, and corresponding circuits in interconnect module 74. Circuits 186 and 188 respectively provide non-inverted and inverted transfer clock signals 187 and 189 each constituting a single-ended TTL-compatible signal.

Note that the output of differential receiver 180 is a sixteen-bit wide path supplied to registers 182 and 184, each of which constitute sixteen-bit wide storage devices. The output of registers 182 and 184 are supplied to lower and upper halves of a thirty-two bit wide path 192, and supplied as input to FIFO memory 190, which constitutes a thirty-two bit wide memory. Lines of path 192 are also connected to a control logic circuit 194. Control logic circuit 194 also receives type-and-mask information from an ECL differential receiver 196, and uses command information received from lines 192 and type-and-mask information received from receiver 196 to generate command instructions compatible with VMEbus 48, and to provide acknowledgment of requests originated from the VMEbus.

The invention thus comprises control means for initiating transfer of information from the first interface circuit to the second interface circuit and from the second interface circuit to the first interface circuit in response to commands received from the first and second interface circuits. As embodied herein, such control means comprise control circuits 150 and 194.

A parity check circuit 198 receives, via an ECL differential receiver 200 and TTL-to-ECL differential converter circuit 153 (FIG. 5), the parity signal generated by parity generator 152. Parity checker 198 uses this information to check parity on lines 192 and to provide an error signal 202 upon detection of a parity error.

The reset signal generated by ECL converter 174 (FIG. 5) and supplied over interconnect bus 46 is received by an ECL differential receiver 204 and supplied as a reset signal 206 for use by VMEbus 48.

Figure 7:
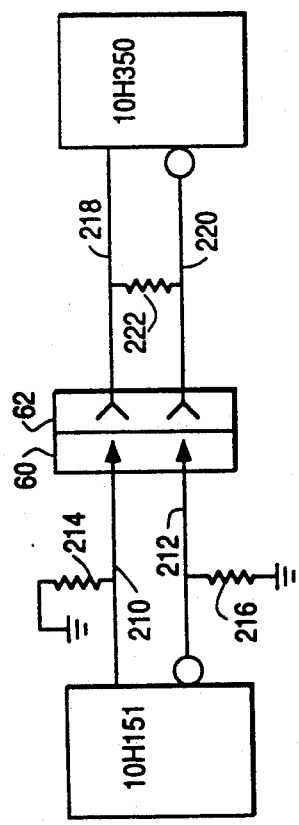
FIG. 7 is an electrical schematic diagram showing termination circuitry for the transmitters and receivers of FIGS. 5 and 6, respectively.

FIG. 7 shows details of the termination circuitry of ECL differential converters and ECL differential receivers shown in FIGS. 5 and 6. As can be seen in FIG. 7, each converter includes a non-inverted output 210 and an inverted output 212. The inverted output 212 is indicated by a circle at the output of the respective ECL differential converter.

A termination resistor 214 is connected between output 210 and ground. Similarly, a termination resistor 216 is connected between output 212 and ground. In the preferred embodiment, termination resistors 214 and 216 each have a value of 360 ohms.

Each ECL differential receiver includes a non-inverted input 218 and an inverting input 220. A termination resistor 222 is connected between inputs 218 and 220 of each ECL differential receiver. In the preferred embodiment, the value of resistor 222 is 110 ohms. As a result, each twisted pair exhibits an impedance of 105 ohms.

A description of the operation of interconnect modules 68, 70, 72, and 74 will now be provided, with reference to FIGS. 5 and 6. When data is received by FIFO 140, a "FIFO NOT EMPTY" signal is generated and supplied to control circuit 150. Control circuit 150 then causes circuit 140 to supply thirty-two bits of data on output lines 141. The upper sixteen bits of data are supplied to register 142 and the lower sixteen bits of data are supplied to register 144. This data is clocked into respective registers 142 and 144 upon the rising edge of clock signal 154. Data from registers 142 and 144 appears at inputs of multiplexer 146. One or the other of the sets of data appearing at the inputs of multiplexer 146 will be supplied as output from multiplexer 146, depending upon the state of the SEL terminal of multiplexer 146. Since the SEL terminal is connected to clock signal 156, the SEL terminal of multiplexer 146 changes at a 50 MHz rate. Accordingly, multiplexer 146 sequentially transfers the first pair of sets of information from registers 142 and 144 over data lines of information path 52.

The first pair of sixteen bit sets of information from registers 142 and 144 is supplied via twisted-pair cable 56, connector 60, connector 62, and twister pair cable 58 to differential receiver 180 of module 70 (FIG. 6).

It should be recalled that strobe signal 165 is supplied as a differential signal at a rate of 25 MHz to clock signal ECL differential receiver circuits 186 and 188, the outputs of which are respectively connected to clock terminals of registers 182 and 184. Since the strobe signal received by circuits 186 and 188 is respectively supplied to registers 182 and 184 as a non-inverted and inverted transfer clock signal, registers 182 and 184 each transfer sixteen bits of data from respective lines of the output of circuit 180 into each of the registers 182 and 184 at a 25 MHz rate. The output of registers 182 and 184 is then supplied to lines 192 as thirty-two bit wide words for storage in FIFO 190 at an effective rate of 50 MHz.

It can be appreciated from the above description that the invention includes first demultiplexer means coupled to the second connector for receiving the first pair of sets of information sequentially transferred by the first multiplexer and for respectively supplying the first pair of sets of information to the second group of registers. As embodied herein, the first demultiplexer means comprises differential receiver circuits 180, 186, and 188. The invention also comprises second demultiplexer means coupled to the first connector for receiving the second group of sets of information sequentially transferred by the second multiplexer and for respectively supplying the second group of sets of information to the fourth group of registers. As embodied herein, the second demultiplexer means comprises differential receiver circuits of interconnect module 74 corresponding to differential receiver circuits 180, 186, and 188.

As noted previously, interconnect modules 72 and 74 are respectively identical to module 68 and 70. Thus, operation of modules 72 and 74 transpires in an analogous manner.

The apparatus and methods described above thus provide two sixteen bit data paths, using a positive acknowledge protocol to exhibit a raw bandwidth of 100 Mbytes/second, with a 25 MHz continuous data strobe. All data is transferred in thirty-two bit words, with sixteen bit entities being clocked on both rising and falling edges of a clock.

Figure 8:
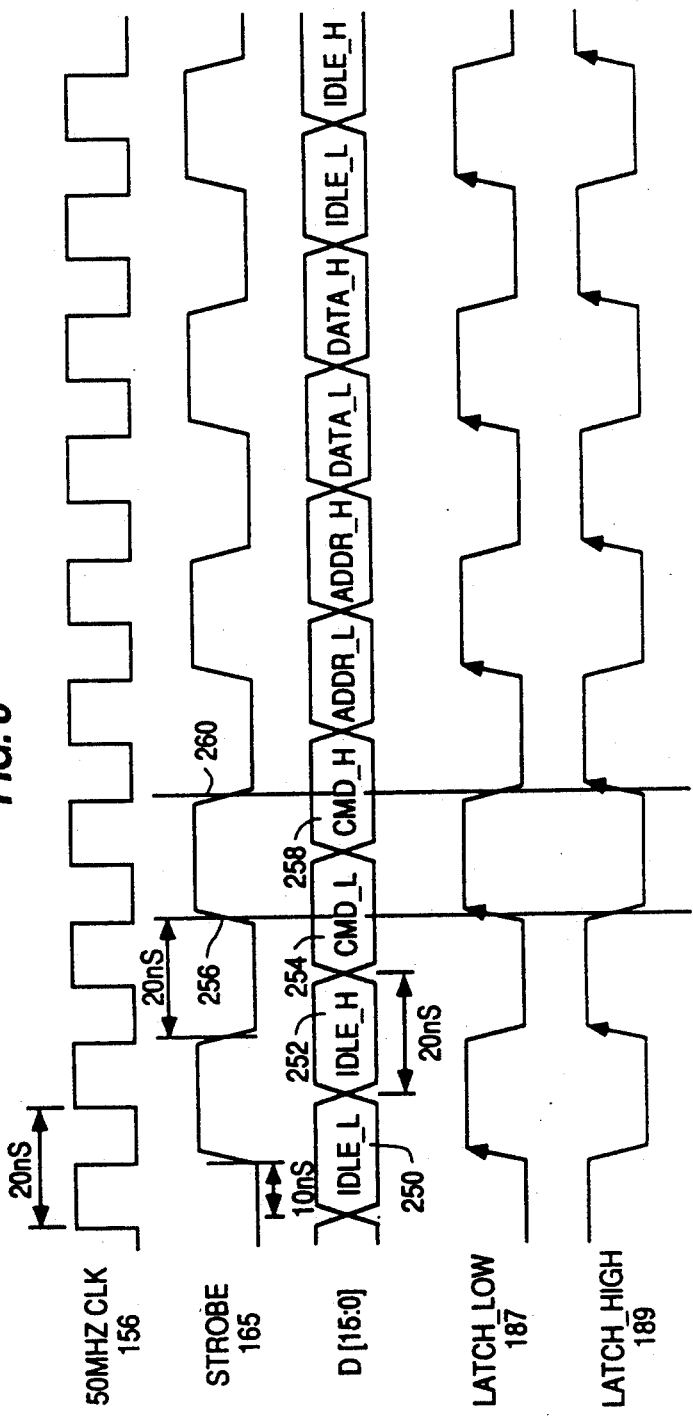
FIG. 8 is a timing diagram showing timing relationships between signals of the system shown in FIGS. 1-6.

FIG. 8 is a timing diagram showing relative timing of various signals of the apparatus shown in FIG. 2, for a WRITE WORD cycle. As seen in FIG. 8, clock signal 156 (also shown in FIG. 5) constitutes clock pulses at a rate of 50 MHz. Each full clock cycle constitutes 20 nS. Strobe signal 165 (also shown in FIG. 5) has a rate of 25 MHz, with each half cycle having a period of 20 nS, and is delayed 10 nS. The outputs 187 and 189 of circuits 186 and 188 of FIG. 6 constitute a pair of clock signals of opposite phase having a rate of 25 MHz. These signals are used to clock data into registers 182 and 184, such that the rising edge of the signal output by circuit 186 clocks data into register 182 and the rising edge of the output of circuit 188 clocks data into register 184.

Accordingly, a WRITE WORD cycle consists of a pair of idle cycles 250 and 252, followed by a command cycle 254 in which bits 0–15 of a command word are transmitted. The rising edge of the strobe signal 165, at the time indicated as 256, causes the sixteen bits of data appearing at the output of circuit 180 in cycle 254 (i.e., the lower bits) to be clocked into register 182. In command cycle 258, the upper bits of a command word are transferred over interconnect bus 46. The falling of strobe signal 165 occurring at time 260 coincides with a rising edge of signal 189 output by circuit 188. The rising of signal 189 latches the upper sixteen bits of data, transferred over interconnect bus 46 after the lower sixteen bits, into register 184.

In a similar manner, the low and high bits of an address word, and the low and high bits of a data word are sequentially transferred into registers 182 and 184 and supplied to FIFO 190. At the conclusion of the WRITE WORD cycle, a pair of idle cycles are transmitted.

Although the preferred embodiment employs a pair of differential receiver circuits for strobe signal 165 to provide that data will be strobed into interconnect module 70 on both the rising and falling edges of strobe signal 165, other methods of such double-edge strobing could be employed. For example, a pair of latch circuits could be provided in place of registers 182 and 184 which directly latch from a single-ended version of signal 165 on the positive- and negative-going pulse edges, respectively, of signal 165.

Transactions are conducted over interconnection bus 46 using a positive acknowledge signal and using the flags described below in Table 14. Flags A and B are located in module 68 (FIG. 2), and flag C is located in module 72.

TABLE 14

| | YAbus Protocol Flags | | | |
|---|---|---|---|---|
| Flag | Set with: | Cleared when: | Prevents: | Why? |
| A | Host begins PIO | YTM Receives PIO_Ack Read or Write | Host Request entering MTY | Because the MVIB's buffers and latches can only stack one out-standing transfer |
| B | MTY returns VME READ_ack on Block DMA | YTM receives the Purge_complete command | Any transfer from entering MTY | So VME can purge unused returned DMA data inside the YTV |
| C | VME begins transfer to PIO or DMA | YTV receives any VME_ack (PIO or DMA) | VME request from leaving VTY | Because we must know that the DMA completed (to prevent FIFO overrun) |

The invention includes means for receiving a block data read command from interface circuit 76 and for transferring the block data read command to interface circuit 75. As embodied herein this means comprise interconnect module 72 which transmits a read block command over interconnect bus 46 to interconnect module 74, which causes a DMA READ REQUEST command to be transmitted to interface circuit 75 and, subsequently, over TURBOchannel 46.

The invention further includes means in the first interconnect module for sending a block data read acknowledge signal and the requested data to interface circuit 76 in response to a block data read command from interface circuit 76 and for setting a block data read flag upon sending of the block data read acknowledge signal. As embodied herein, these means comprise control circuit 150 which, upon receipt of the READ BLOCK command generates a READ BLOCK ACK signal which is transmitted over interconnect bus 46. At the same time, the B flag is set, as indicated in Table 14, and stored in control circuit 150.

Control circuit 150 generates signals to host interface circuit 75 to prevent host interface circuit 75 from accepting any commands from the TURBOchannel so long as the B flag is set.

The invention further preferably includes means in interconnect module 70 for temporarily storing data received in response to the block data read command, for purging the storage means, and for transmitting a purge complete command to the fourth interconnect module when purging of the storage means is complete. As embodied herein, such means comprise FIFO 190 of interconnect module 70, which receives data transmitted over interconnect bus 46 from subsystem 22 in response to the DMA read command originally issued by the VMEbus. After all requested data has been received in FIFO 190, control circuit 194 will flush any unused data from FIFO 190 and send the appropriate indication to VIC control circuit 100. VIC control circuit 100 then causes control circuit 150 of interconnect module 72 to generate a PURGE COMPLETE command for transmission over information path 54 to interconnect module 74.

The invention further preferably includes means for resetting the block data read flag when a purge complete command is received by interconnect module 74. Such means are embodied in control circuit 150 of interconnect module 68, which resets the B flag when a PURGE COMPLETE command has been received by interconnect module 74.

The invention further preferably includes means for receiving a data transfer command from interface circuit 76, for transmitting the data transfer command to interface circuit 75 over information path 54, for setting a data transfer flag upon transmission of the data transfer command, and for preventing transmission over information path 54 of commands received by interconnect module 72 from interface circuit 75 when the data transfer flag is set. As embodied herein, such means comprise control circuits 150 of interconnect modules 68 and 72. I/O interface circuit 76 receives data transfer commands, including READ, WRITE, DMA READ, and DMA WRITE commands. I/O interface circuit 76 supplies these commands to control circuit 150 of interconnect module 72, which in turn generates corresponding commands such as READ WORD, WRITE WORD, READ BLOCK, and WRITE BLOCK commands (corresponding to data transfer commands from the VMEbus) for transmission over information path 54. Upon transmission of any such command, control unit 150 of interconnect module 72 sets the C flag. So long as the C flag is set, no VMEbus commands can be translated and transmitted over information path 54.

Preferably the invention includes means for generating a data transfer acknowledge signal in response to receipt of a data transfer command by interconnect module 74 and for sending the data transfer acknowledge signal to the interconnect module 70. Such means are embodied in control circuit 150 of interconnect module 68 which generates a READ WORD ACK, WRITE WORD ACK, READ BLOCK ACK, or WRITE BLOCK ACK signal, as appropriate, upon receipt of a corresponding data transfer command by interconnect module 74.

The invention further preferably includes means for resetting the data transfer flag upon receipt of the data transfer acknowledge signal by interconnect module 70. Such means are embodied by control circuit 150 of interconnect module 72, which resets the C flag whenever the corresponding acknowledge signals are received by interconnect module 70.

Figure 9:
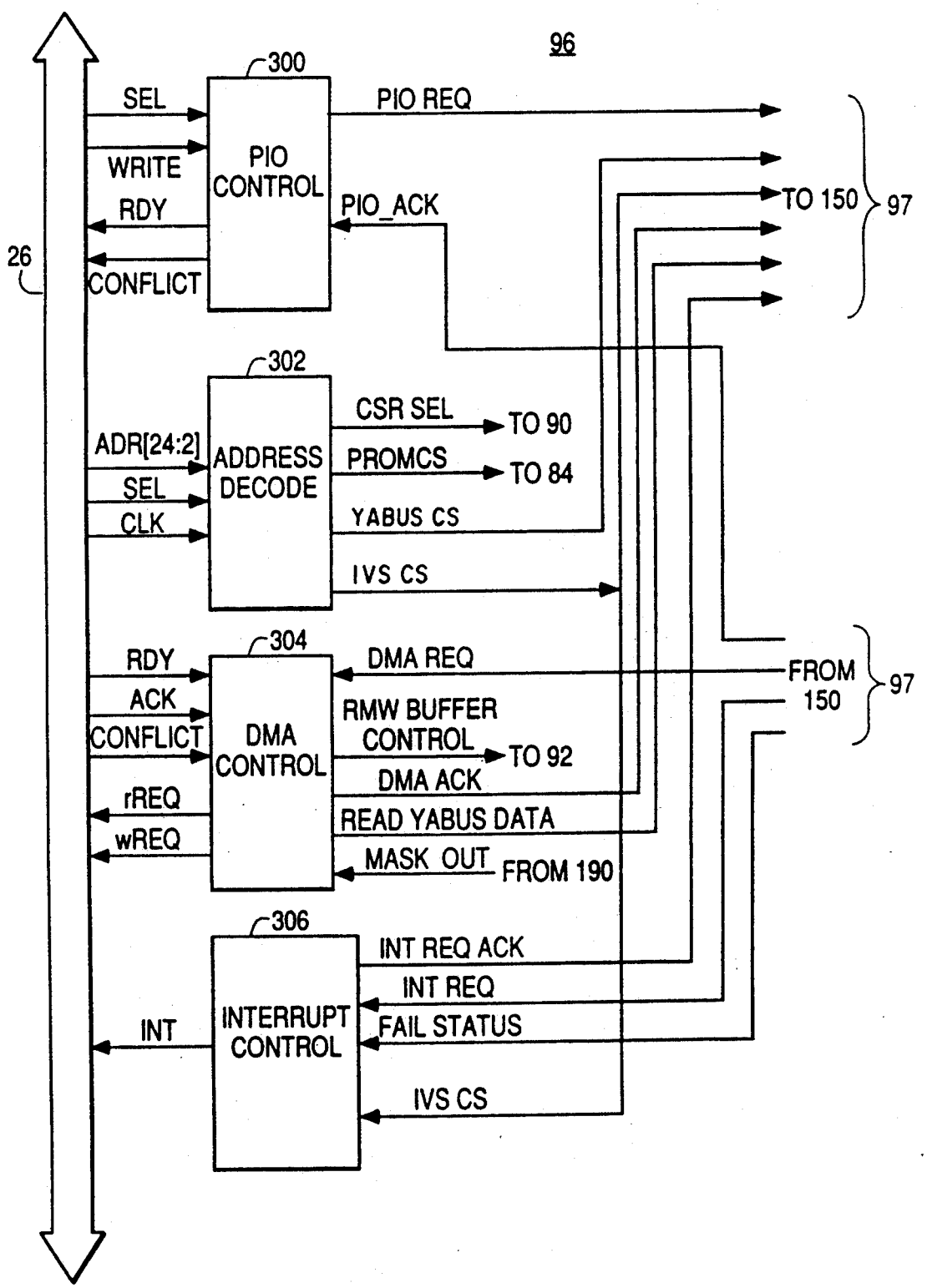
FIG. 9 is a detailed block diagram showing the configuration of the control circuit of FIG. 4.

Referring now to FIG. 9, control circuit 96 of FIG. 3 is shown in greater detail. Control circuit 96, in the preferred embodiment includes four state machine devices 300, 302, 304, and 306 respectively designated PIO control, address decode, DMA control, and interrupt control. PIO control device 300 manages the TURBOchannel interface for programmed I/O requests. PIO control device 300 includes select and write inputs which respectively accept PIO read word requests and PIO write word requests. PIO control device 300 also receives as input PIO_ACK signals from a protocol sequence checker of circuit 150, to be described in greater detail below. PIO control device 300 generates outputs to TURBOchannel 26 including an rdy signal and a conflict signal. PIO control device 300 also generates a PIO_REQ signal to a command generator circuit of circuit 150, to be described in greater detail below.

Address decode device 302 resolves which typ of transaction is being requested by a PIO cycle, by performing the functions of decoding all PIO cycles and enabling signal paths. Address decode device 302 receives 22 bits of address information from TURBOchannel 26, along with select and clock signals. Address decode device 302 produces a csr chip select signal for csr circuit 90, a PROM chip select signal supplied to PROM 84, a ivs chip select signal and a yabus chip select signal to a command generator circuit of control circuit 150, to be described below in greater detail.

DMA control device 304 manages the TURBOchannel interface for Direct Memory Access requests originated from the VME bus. DMA control device 304 performs the functions of accepting DMA requests from a command decoder of control circuit 150, requesting TURBOchannel access, generating DMA cycles on the TURBOchannel (including address and data information), generating RMW operations for partial words, generating a DMA acknowledge signal to an arbiter for bus 46, and feeding data to interconnect module 68 on block read commands. DMA control device 304 receives rdy, ack, and conflict signals from TURBOchannel 26, as well as a DMA REQ signal from control circuit 150. DMA control device 304 provides rReq and wReq signals to TURBOchannel channel 26, and a RMW_buffer_control signal to register 92, a DMA_ACK signal to circuit 150, and a read_data signal to circuit 150.

Interrupt control device 306 handles interrupt requests initiated on the VMEbus and posts these requests onto TURBOchannel. 26. It performs the functions of asserting an interrupt request on the TURBOchannel in response to a request received over interconnect bus 46 and a clear function upon a CPU read of an ivs register. Interrupt control device 306 receives INT_REQ and FAIL STATUS signals from circuit 150. Interrupt control device 306 generates an int signal to TURBOchannel 26 and an INT_REQ_ACK signal to circuit 150.

Figure 10:
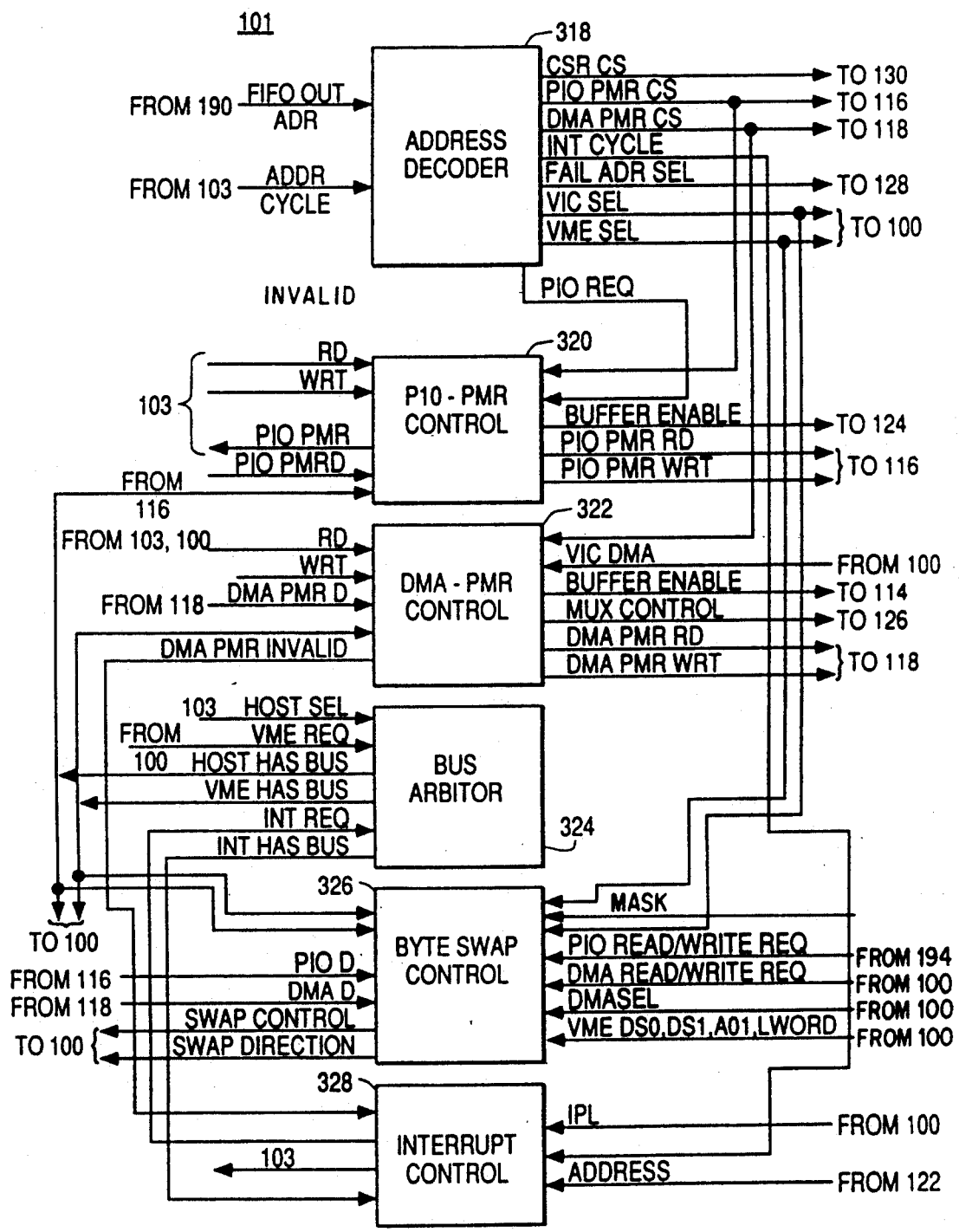
FIG. 10 is a detailed block diagram showing the configuration of the control circuit of FIG. 5.

Referring now to FIG. 10, there is shown a detailed block diagram of control circuit 101 of I/O interface circuit 76. Circuit 101 includes six state machine devices 318, 320, 322, 324, 326, and 328. Device 318 comprises a PIO address decoder device which resolves which type of transactions are requested by a PIO cycle on interconnect bus 46. It performs the functions of decoding all PIO cycles and enabling proper paths. Address decoder device 318 receives 22 FIFO_out address signals from FIFO 190. Device 318 also receives a addr_cycle signal from control circuit 150 of module 70. Address decoder device 318 produces a csr chip select signal to CSR 130. Other outputs of address decoder device 318 include a PIO_pmr chip select signal to PIO-PMR RAM 116 and to PIO-PMR control device 320. Address decoder device 318 further produces a DMA_pmr chip select signal, which is supplied to DMA-PMR RAM 118 and to DMA-PMR control device 322. An INT_cycle signal is supplied to interrupt control device 328, and failing_addr chip select signal to fail address register 128. Finally, address decoder device 318 provides a VIC_sel and VME_sel signal to VIC control circuit 100.

PIO PMR control device 320 manages the PIO page map RAM for writing and reading (load and test) and accessing (PIO requests) the RAM. It also posts errors in the event of an access to an invalid register. Device 320 performs the functions of enabling data paths for load of the PMR and for testing of the PMR, enabling data paths for DMA access for the PMR, and testing for invalid pmr. Device 322 receives PIO_PMR chip select and PIO_REQ signals from address decoder 318. Device 320 further receives rd and wr signals from circuit 150 and a pio_pmr_d signal from PIO-PMR RAM 116.

Device 320 produces as output a buffer_enable signal to data buffer 124, pio_pmr_rd and pio_pmr_wr signals to RAM 116, and a pio_pmr_invalid signal to circuit 150.

DMA PMR control device 322 manages the DMA page map register for writing and reading (load and test) and accessing DMA requests to write the RAM. It also posts errors in the event of an access to an invalid register. Device 322 performs the functions of enabling data paths for loading and testing of the pmr's, enabling address paths for DMA access of the pmr's and testing for an invalid pmr. Device 322 receives a DMA_pmr chip select signal from address decoder device 318 and a vic_DMA_REQ signal from VIC control circuit 100. Device 322 also receives rd and wr signals from control circuit 194 and from VIC control circuit 100. Device 322 further receives a dma_pmr_D signal from RAM 118. Device 322 produces as output A buffer_enable signal to buffer 114, a mux_control signal to multiplexer 126, DMA_PMR_RD and dma_pmr_WR signals to DMA PMR 118. Finally, device 322 produces a dma_pmr_invalid signal to interrupt control device 328.

Bus arbiter device 324 manages the internal buses 108 and 110 of circuit 76. It performs the function of arbitrating between host requests, VME requests, and interrupt requests. Device 324 receives a host_sel signal from circuit 194, a vme_REQ signal from VIC control circuit 100, and an interrupt_req signal from interrupt control device 328. Device 324 produces a host_has_bus signal to PIO-PMR control device 320, VIC control circuit 100, and byte swap control device 326. Device 324 also produces a vme_has_bus signal to DMA-PMR control device 322, VIC control circuit 100, and byte swap control device 326. Finally, device 324 outputs an interrupt_has_bus signal to interrupt control device 328.

Byte swap control device 326 manages the data path between interconnect bus 46 and VMEbus 48. It performs the functions of swapping bytes on a thirty two-bit word boundary as specified by control bits in the page map registers. That is, byte swap control is defined on a page-by-page basis. Device 326 receives a PIO_d byte swap control signal from RAM 116 and a DMA_d byte swap control signal from RAM 118. Device 326 also receives a 3-bit mask signal from FIFO 190, and a VME_ds0 −ds1, _A01, _LWORD signal from VIC control circuit 100. Device 326 also receives vme_has_bus and host_has_bus signals from bus arbiter device 324, PIO_read/write request signals from control circuit 194, and DMA_read/write request signals from VIC control circuit 100. Finally, device 326 receives a DMA chip select signal from VIC control circuit 100. Device 326 provides swap_control and swap_direction signals to VIC control circuit 100.

Interrupt control device 328 manages the interrupt generated by VME bus 48 and circuit 76 via VIC control circuit 100. These interrupt requests are interpreted and an interrupt_request message is formatted for interconnect bus 46. Device 328 performs the functions of sampling the IPL signal from the IC control circuit 100 to detect requests, setting a latch for any detected request at each IPL level, posting interrupt requests to circuit 150, and sampling interrupt vector requests cycles to clear a latch. Device 328 receives an IPL signal from VIC control circuit 100, and interrupt_cycle signal from PIO address decoder 318, and a four-bit address signal indicating the IPL level from address buffer 122. Device 328 produces an output signal consisting of an interrupt request to circuit 150.

Figure 11:
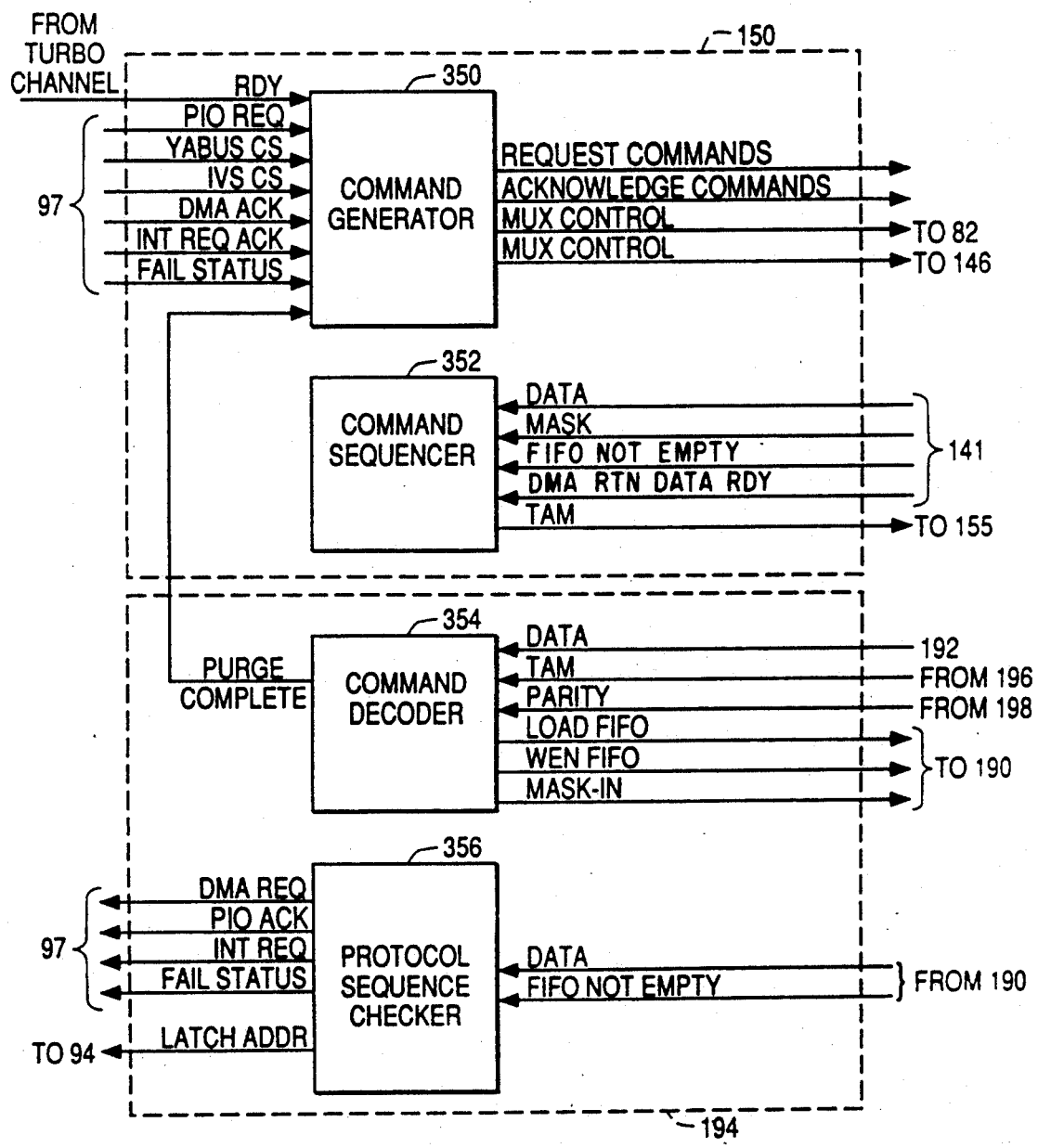
FIG. 11 is a detailed block diagram of control circuits of FIGS. 5 and 6.

Referring now to FIG. 11, control circuits 150 and 194 are shown in greater detail. Circuit 150 includes a command generator state machine device 350 and a command sequencer state machine device 352. Command generator 350 generates and formats commands for transmission over interconnect bus 46. It performs the functions of generating and formatting such commands, loading FIFO 140, controlling multiplexer 146 for PIO requests, generating DMA_ACK signals, and performing arbitration control for PIO_REQ's versus DMA_ACK's. Device 350 receives a PIO_REQ signal from PIO control device 300, a YAbus chip select signal from address decoder 302, an IVS chip select signal from address decoder 302, a DMA_ACK signal from DMA control device 304, a rtn_data_rdy signal in the form of n rdy signal from TURBOchannel 26, and INT_REQ_ACK signal from interrupt control device 306, and a FAIL_STATUS signal from protocol sequence checker device 356. Device 350 generates 16 bits of data consisting of request commands and acknowledge commands for storage in FIFO 140, a mux_control signal for multiplexer 82, and a mux_control signal for multiplexer 146.

Command sequencer device 352 manages interconnect module 68 and ensures that appropriate commands and data are always being sent. It performs the functions of feeding interconnect bus 46, creating type and mask signals, and checking sequence. Device 352 receives sixteen-bit data signals and 4 type-and-mask signals from lines 141, a fifo_not empty from FIFO 140, and a dma_rtn_data ready signal from FIFO 140. Device 352 generates three bits of type-and-mask signals supplied to driver 155. Device 352 also contains internal flags A and D.

Circuit 194 includes a command decoder state machine device 354 and a protocol sequence checker state machine device 356. Command decoder device 354 receives messages from interconnect bus 46, verifies them, and loads appropriate commands, address and data into FIFO 190. Command decoder device 354 performs the functions of interpreting commands from interconnect bus 46; detecting errors such as invalid command, out-of-sequence operations, and parity errors; loading FIFO 190 with command, address, data, type-and-mask information; and screening for idle cycles. Decoder device 354 receives sixteen bits of data from lines 192, three bits of type-and-mask information from circuit 196, and three bits of parity information from parity checker circuit 198. Outputs from command decoder device 354 include signals supplied to FIFO 190, a purge_complete signal supplied to command generator device 350, and a wen_fifo signal supplied to FIFO circuit 190.

Protocol sequence checker device 356 pulls commands from FIFO 190, and requests transactions from state machines 300, 304, and 306. It performs the functions of interpreting commands from interconnect bus 46, loading address information for DMA request operations, generating DMA_REQ signals, feeding DMA write data to device 304, generating PIO_ACK signals, feeding PIO acknowledge information to PIO control device 300, notifying of interrupt requests, and notifying of failure requests. Inputs to device 356 includes sixteen bits of data from FIFO 190 and a fifo_not_empty signal from FIFO 190. Outputs from device 356 include a DMA_REQ signal supplied to DMA control device 304, a PIO_ACK signal supplied to PIO control device 300, and INT_REQ signal supplied to interrupt control signal 306, a FAIL_STATUS signal supplied to devices 300, 304, 306 and 350, and a latch_addr signal supplied to register 94 (FIG. 3).

FIG. 11 shows control circuits 150 and 194 of modules 68 and 74, using appropriate signal terminology. Corresponding circuits for modules 70 and 72 are of identical construction; however, PIO and DMA terminology for request and acknowledge signals are reversed.

The present preferred embodiment employs discrete circuitry, as set forth above. However, the system of the present invention is well suited for implementation in application-specific integrated circuit (ASIC) technology. For example, the functions of host interface circuit 75 and I/O interface circuit 76 could each be implemented in separate ASICs. Similarly, the functions of interconnection modules 68 and 74 (other than differential drivers) could be implemented in a single ASIC, as could the functions of interconnection modules 70 and 72.

Although in the present preferred embodiment, each unidirectional information path 52 and 54 includes a single set of sixteen-bit data signals, the invention is not so limited. In certain applications, it may be desired to achieve higher data transfer rates by providing that each unidirectional information path employs a group of sets of multiconductor signals. Moreover, in an alternative embodiment, a high speed fiber optic data link could be interposed between connectors 60 and 62 to provide a long distance interconnect. For example, a type GA9711 data link transmitter and a type GA9012 data link receiver, commercially available from the Gazelle Corporation, could be directly inserted between connectors 61 and 62 to achieve a high speed long distance interconnect between a pair of information buses.

The present invention thus provides apparatus and methods for interconnecting first and second information buses in which high data transfer rates are achieved. By use of pseudo-ECL techniques, current spikes are avoided, thereby reducing electromagnetic interference. Similarly, the use of pseudo-ECL compatible voltage levels over twisted-pair cables reduces susceptibility of the system to adverse effects of noise. Moreover, the use of a pair of multiconductor unidirectional information paths minimizes the number of signals required for interconnecting the information buses, thereby reducing cost and complexity.

It will be apparent of those skilled in the art that various modifications and variations can be made in the apparatus and method of the present invention. Thus, it is intended that the specification and drawings be considered as exemplary only, with the true scope and spirit of the invention being indicated by the following claims.

We claim:

1. Apparatus for interconnecting first and second interface circuits respectively coupled to first and second information buses each having a plurality of data lines, the apparatus comprising:

first and second unidirectional information paths each having conductors for conducting a plurality of data signals, each of the first and second information paths conducting a number of data signals less than the number of data lines in at least one of the information buses;

a first interconnect module for coupling to the first interface circuit, the first interconnect module comprising a first pair of registers each for respectively and simultaneously receiving a set of a first pair of sets of information from the first interface circuit, a first multiplexer for sequentially transferring each set of the first pair of sets of information bits from the first pair of registers over the data lines of the first information path, and a first connector coupled to the first multiplexer;

a second interconnect module for coupling to the second interface circuit, the second interconnect module comprising a second pair of registers each for respectively supplying a set of the first pair of sets of information bits to the second interface circuit, a second connector removably connected to the first connector, and first demultiplexer means coupled to the second connector for receiving the first pair of sets of information bits sequentially transferred by the first multiplexer and for respectively supplying the first pair of sets of information bits to the second pair of registers;

a third interconnect module for coupling to the second interface circuit and comprising a third pair of registers each for respectively and simultaneously receiving a set of a second pair of sets of information bits from the second interface circuit, a second multiplexer coupled to the second connector for sequentially transferring each set of the second pair of sets of information bits from the third pair of registers over the data lines of the second information path; and a fourth interconnect module for coupling to the first interface circuit and comprising a fourth pair of registers each for respectively and simultaneously supplying a set of the second pair of sets of information bits to the first interface circuit, and second demultiplexer means coupled to the first connector for receiving the second pair of sets of information bits sequentially transferred by the second multiplexer and for respectively supplying the second pair of sets of information bits to the fourth pair of registers.

2. Apparatus as recited in claim 1, comprising control means, operatively coupled to the first, second, third, and fourth interconnect modules, for initiating transfer of information from the first interface circuit to the second interface circuit in response to commands received from the first and second interface circuits.

3. Apparatus as recited in claim 1, comprising:
a first twisted-pair cable included in the first information path and connected to the first connector;
first ECL differential converter means coupled between the first multiplexer and the first twisted-pair cable for converting TTL-compatible signals into ECL-compatible differential signals for transmission over the twisted-pair first cable;
a second twisted-pair cable included in the first information path and connected to the second connector;
a third twisted-pair cable included in the second information path and connected to the second connector;
a first ECL differential receiver, included in the first demultiplexer means and coupled between the second twisted pair cable and the second pair of registers, for converting ECL-compatible differential signals received over the second twisted-pair cable to TTL-compatible signals;
second ECL differential converter means coupled between the second multiplexer and the third twisted-pair cable for converting TTL-compatible signals into ECL-compatible differential signals for transmission over the third cable;
a fourth twisted-pair cable included in the second information path and connected to the first connector; and
a second ECL differential receiver, included in the second demultiplexer means and coupled between the fourth twisted pair cable and the fourth pair of registers, for converting ECL-compatible differential signals received over the fourth cable to TTL-compatible signals.

4. Apparatus as recited in claim 1, comprising:
means for respectively supplying first and second clock signals respectively having first and second clock rates to the first and third pairs of registers to store information in the first and third pairs of registers; and
means for respectively supplying third and fourth clock signals, respectively having third and fourth clock rates respectively twice the first and second clock rates, to the first and second multiplexers so as to respectively transfer information over the first and second information paths at the third and fourth clock rates.

5. Apparatus as recited in claim 4, comprising means for respectively transmitting the first and second clock signals over the first and second information paths, means for receiving the transmitted clock signals, and means respectively coupled to the second and fourth pairs of registers for latching the transferred information into the second and fourth pairs of registers on both the rising and falling edges of the transmitted clock signals.

6. Apparatus as recited in claim 5, wherein the means for supplying first and second clock signals comprises divider means for respectively dividing the third and fourth clock signals down to the first and second clock rates to produce the first and second clock signals and for respectively supplying the first and second clock signals over the first and second information paths; and
first and second clock multiplexer means for respectively converting the transmitted first and second clock signals to transfer clock signals supplied to the second and fourth pairs of registers to respectively transfer information from the second and fourth pairs of registers to the second and first interface circuits at the third and fourth clock rates.

7. Apparatus as recited in claim 6, wherein:
the divider means comprises a first 2:1 divider circuit for dividing the third clock signal;
the means for supplying first and second clock signals comprises a first delay circuit coupled to the first divider circuit to receive the divided third clock signal, and a first clock signal ECL differential driver circuit coupled between the first delay circuit and the first connector to supply the divided third clock signal to the first information path as an ECL-compatible differential signal;

the first clock multiplexer means comprises first and second clock signal ECL differential receiver circuits coupled to the second connector and respectively coupled to first and second registers of the second register pair to supply the transmitted first clock signal respectively to the first and second registers of the second register pair as non-inverted and inverted transfer clock signals each constituting a single-ended TTL-compatible signal;

the divider means further comprises a second 2:1 divider circuit for dividing the fourth clock signal;

the means for supplying first and second clock signals further comprises a second delay circuit coupled to the second divider circuit to receive the divided fourth clock signal, and a second clock signal ECL differential driver coupled between the second delay circuit and the second connector to supply the divided fourth clock signal to the second information path as an ECL-compatible differential signal; and the second clock multiplexer means comprises third and fourth clock signal ECL differential receiver circuits coupled to the first connector and respectively coupled to first and second registers of the fourth register pair to supply the transmitted second clock signal respectively to the first and second registers of the fourth register pair as non-inverted and inverted transfer clock signals each constituting a single-ended TTL-compatible signal.

8. Apparatus as recited in claim 7, wherein the first and second delay circuits each have a delay period equal to one-half the period of the third and fourth clock signals.

9. Apparatus as recited in claim 7, wherein:

the first clock signal ECL differential driver comprises a non-inverted output and an inverted output;

the first clock signal ECL differential receiver circuit comprises a non-inverted input coupled, via the first information path, to the non-inverted output of the first clock signal ECL differential driver circuit; an inverted input coupled, via the first information path, to the inverted output of the first clock signal ECL differential driver circuit; and an output coupled to the first register of the second pair of registers;

the second clock signal ECL differential receiver circuit comprises an inverted input coupled, via the first information path, to the non-inverted output of the first clock signal ECL differential driver circuit; a non-inverted input coupled, via the first information path, to the inverted output of the first clock signal ECL differential driver circuit; and an output coupled to the second register of the second pair of registers;

the second clock signal ECL differential driver comprises a non-inverted output and an inverted output;

the third clock signal ECL differential receiver circuit comprises a non-inverted input coupled, via the second information path, to the non-inverted output of the first clock signal ECL differential driver circuit; an inverted input coupled, via the second information path, to the inverted output of the second clock signal ECL differential driver circuit; and an output coupled to the first register of the fourth pair of registers; and the fourth clock signal ECL differential receiver circuit comprises an inverted input coupled, via the second information path, to the non-inverted output of the second clock signal ECL differential driver circuit; a non-inverted input coupled, via the second information path, to the inverted output of the second clock signal ECL differential driver circuit; and an output coupled to the second register of the fourth pair of registers.

10. Apparatus as recited in claim 1, comprising:

means for receiving a BLOCK DATA READ command from the second interface circuit to request data from the first interface circuit, and for transferring the BLOCK DATA READ command to the first interface circuit;

means in the first interconnect module for sending a BLOCK DATA READ ACKNOWLEDGE signal and the requested data to the second interconnect module in response to a BLOCK DATA READ command from the second interface circuit and for setting a BLOCK DATA READ flag upon sending of the BLOCK DATA READ ACKNOWLEDGE signal;

means in the first interconnect module for preventing receipt of commands from the first interface circuit when the BLOCK DATA READ flag is set;

means in the second interconnect module for temporarily storing data received in response to the BLOCK DATA READ command, for purging the storage means, and for transmitting a PURGE COMPLETE command to the fourth interconnect module when purging of the storage means is complete; and means for resetting the BLOCK DATA READ flag when a PURGE COMPLETE command is received by the fourth interconnect module.

11. Apparatus as recited in claim 1, comprising:

means for receiving a DATA TRANSFER command from the second interface circuit, for transmitting the DATA TRANSFER command to the first interface circuit over the second information path, for setting a DATA TRANSFER flag upon transfer of the DATA TRANSFER command, and for preventing transmission over the second information path of commands received by the third interconnect module from the second interface circuit when the DATA TRANSFER flag is set;

means for generating a DATA TRANSFER ACKNOWLEDGE signal in response to receipt of a DATA TRANSFER command by the fourth interconnect module and for sending the DATA TRANSFER ACKNOWLEDGE signal to the second interconnect module; and means for resetting the DATA TRANSFER flag upon receipt of the DATA TRANSFER ACKNOWLEDGE signal by the second interconnect module.

12. Apparatus for interconnecting an interface circuit, coupled to a first information bus, to an adapter module coupled to a second information bus, each of the information buses having a plurality of data lines, the apparatus comprising:

first and second unidirectional information paths each having conductors for conducting a plurality of data signals, each of said first and second information paths conducting a number of data signals less than the number of data lines in at least one of the information buses;

a transmitter interconnect module for coupling to the interface circuit, the transmitter interconnect module comprising a first pair of registers each for respectively and simultaneously receiving a set of a first pair of sets of information bits from the interface circuit, and a multiplexer for sequentially transferring each set of the first pair of sets of information bits from the first pair of registers over the data lines of the first information path, and a connector coupled to the multiplexer; and a receiver interconnect module for coupling to the interface circuit, the receiver interconnect module comprising a second pair of registers each for respectively and simultaneously supplying a set of a second pair of sets of information bits to the interface circuit, and demultiplexer means coupled to the connector for sequentially receiving the second pair of sets of information bits over the second information path and for respectively supplying the second pair of sets of information bits to the second pair of registers; and control means for initiating transfer of information bits from the interface circuit to the adapter module in response to commands received from the interface circuit, and for responding to requests from the adapter module to the interface circuit.

13. Apparatus as recited in claim 12, comprising:
a first twisted-pair cable included in the first information path and connected to the connector;
ECL differential converter means coupled between the multiplexer and the first twisted-pair cable for converting TTL-compatible signals into ECL-compatible differential signals for transmission over the first cable;
a second twisted pair cable included in the second information path and connected to the connector; and
an ECL differential receiver, included in the demultiplexer and coupled between the second twisted pair cable and the second pair of registers, for converting ECL-compatible differential signals received over the second cable to TTL-compatible signals.

14. Apparatus as recited in claim 12, comprising:
means for supplying a first clock signal having a first clock rate to the first pair of registers to store information in the first pair of registers;
means for supplying a second clock signal, having a second clock rate twice the first clock rate, to the multiplexer; and
means responsive to the second clock signal for transferring information over the first information path at the second clock rate.

15. Apparatus as recited in claim 14, comprising means for transmitting the first clock signal over the first information path, means for receiving from the adapter module a transmitted third clock signal having a rate equal to the first clock signal, and means coupled to the second pair of registers for latching the received information into the second pair of registers on both the rising and falling edge of the third clock signal.

16. Apparatus as recited in claim 15, wherein the means for supplying the first clock signal comprises divider means for respectively dividing the second clock signal down to the first clock rate to produce the first clock signal and for respectively supplying the first clock signal over the first information path; and clock multiplexer means for converting the received third clock signal to transfer clock signals supplied to the second pair of registers to transfer information from the second pair of registers to the interface circuit at the first clock rate.

17. Apparatus as recited in claim 16, wherein:
the divider means comprises a 2:1 divider circuit for dividing the second clock signal;
the means for supplying the first clock signal comprises a delay circuit coupled to the divider circuits to receive the divided second clock signal, and a clock signal ECL differential driver circuit coupled between the delay circuit and the connector to supply the divided second clock signal to the first information path as an ECL-compatible differential signal; and
the clock multiplexer means comprises first and second clock signal ECL differential receiver circuits coupled to the connector and respectively coupled to first and second registers of the second register pair to supply the received third clock signal respectively to the first and second registers of the second register pair as non-inverted and inverted transfer clock signals each constituting a single-ended TTL-compatible signal.

18. Apparatus as recited in claim 17, wherein the delay circuit has a delay period equal to one-half the period of the second clock signal.

19. Apparatus as recited in claim 17, wherein:
the clock signal ECL differential driver comprises a non-inverted output and an inverted output;
the first clock signal ECL differential receiver circuit comprises a non-inverted input for coupling, via the second information path, to a non-inverted output of an associated clock signal ECL differential driver circuit of the interconnect adapter module; an inverted input for coupling, via the second information path, to an inverted output of the associated clock signal ECL differential driver circuit; and an output coupled to the first register of the second pair of registers; and
the second clock signal ECL differential receiver circuit comprises an inverted input for coupling, via the second information path, to the non-inverted output of the associated clock signal ECL differential driver circuit; a non-inverted input for coupling, via the second information path, to the inverted output of the associated clock signal ECL differential driver circuit; and an output coupled to the second register of the second pair of registers.

20. Apparatus as recited in claim 12, comprising:
means for receiving a BLOCK DATA READ command from the adapter module to request data from the interface circuit, and for transferring the BLOCK DATA READ command to the interface circuit;
means in the transmitter interconnect module for sending a BLOCK DATA READ ACKNOWLEDGE signal and the requested data to the adapter module in response to a BLOCK DATA READ command from the interface circuit and for setting a BLOCK DATA READ flag upon sending of the BLOCK DATA READ ACKNOWLEDGE signal;
means in the transmitter interconnect module for preventing receipt of commands from the interface circuit when the BLOCK DATA READ flag is set; and means for resetting the BLOCK DATA READ flag when a PURGE COMPLETE command is received from the adapter module by the receiver interconnect module.

21. A method for interconnecting first and second interface circuits respectively coupled to first and second information buses each having a plurality of data lines, the method comprising the steps of:

respectively and simultaneously receiving a first pair of sets of information bits from the first interface circuit into a first pair of registers;

operating a first multiplexer to sequentially transfer each set of the first pair of sets of information bits from the first pair of registers over conductors of a first information path;

respectively receiving, in a second pair of registers, the first pair of sets of information bits sequentially transferred by the first multiplexer;

respectively and simultaneously supplying the first pair of sets of information bits from the second pair of registers to the second interface circuit;

respectively and simultaneously receiving a second pair of sets of information bits from the second interface circuit into a third pair of registers;

operating a second multiplexer to sequentially transfer each set of the second pair of sets of information bits from the third pair of registers over conductors of a second information path;

respectively receiving, in a fourth pair of registers, the second pair of sets of information bits sequentially transferred by the second multiplexer; and respectively and simultaneously supplying the second pair of sets of information bits from the fourth pair of registers to the first interface circuit.

22. A method for interconnecting an interface circuit, coupled to a first information bus, to an adapter module coupled to a second information bus, each of the information buses having a plurality of data lines, the method comprising the steps of:

respectively and simultaneously receiving a first pair of sets of information bits from the interface circuit into a first pair of registers;

operating a multiplexer to sequentially transfer each set of the first pair of sets of information bits from the first pair of registers over data lines of a first information path;

respectively receiving in sequence, in a second pair of registers from a second information path, a second pair of sets of information bits from the adapter module; and respectively and simultaneously supplying the second pair of sets of information bits from the second pair of registers to the interface circuit.

23. A method as recited in claim 22 wherein the step of respectively receiving in sequence, in a second pair of registers from a second information path, a second pair of sets of information bits from the adapter module comprises the substep of latching the received information into the second pair of registers on both the rising and falling edges of a clock signal.

24. A method for interconnecting an interface circuit, coupled to a first information bus, to an adapter module coupled to a second information bus, each of the information buses having a plurality of data lines, the method comprising the steps of:

respectively and simultaneously receiving a first pair of sets of information bits from the interface circuit into a first pair of registers;

operating a multiplexer to sequentially transfer each set of the first pair of sets of information bits from the first pair of registers over data lines of a first unidirectional information path;

respectively receiving in sequence, in a second path of registers from a second unidirectional information path, a second pair of sets of information bits from the adapter module; and respectively and simultaneously supplying the second pair of sets of information bits from the second pair of registers to the interface circuit.

* * * * *